United States Patent
Bleiman et al.

(10) Patent No.: US 10,703,126 B2
(45) Date of Patent: Jul. 7, 2020

(54) OPTICAL DEVICE THAT PROVIDES FLICKER-LIKE OPTICAL EFFECTS

(71) Applicant: Crane & Co., Inc., Boston, MA (US)

(72) Inventors: Benjamin E. Bleiman, Cumming, GA (US); Samuel M. Cape, Woodstock, GA (US); Paul F. Cote, Hollis, NH (US); Jonathan D. Gosnell, Cumming, GA (US); Gregory R. Jordan, Cumming, GA (US); Scott K. Palm, Reno, NV (US)

(73) Assignee: Crane & Co., Inc., Boston, MA (US)

( * ) Notice: Subject to any disclaimer, the term of this patent is extended or adjusted under 35 U.S.C. 154(b) by 0 days.

(21) Appl. No.: 15/993,327

(22) Filed: May 30, 2018

(65) Prior Publication Data

US 2018/0272788 A1  Sep. 27, 2018

Related U.S. Application Data

(63) Continuation-in-part of application No. 15/129,438, filed as application No. PCT/US2015/022907 on Mar. 27, 2015, now Pat. No. 10,434,812.
(Continued)

(51) Int. Cl.
*B42D 25/324* (2014.01)
*B42D 25/00* (2014.01)
(Continued)

(52) U.S. Cl.
CPC ......... *B42D 25/324* (2014.10); *B42D 25/378* (2014.10); *B42D 25/445* (2014.10);
(Continued)

(58) Field of Classification Search
None
See application file for complete search history.

(56) References Cited

U.S. PATENT DOCUMENTS

| 992,151 A | 5/1911 | Berthon |
| 1,824,353 A | 9/1931 | Jensen |

(Continued)

FOREIGN PATENT DOCUMENTS

| AU | 2009278275 B2 | 7/2012 |
| CA | 2741298 A1 | 4/2010 |

(Continued)

OTHER PUBLICATIONS

Japan Patent Office, "Decision of Refusal," Application No. JP 2017-502936, dated Jul. 9, 2019, 5 pages.
(Continued)

*Primary Examiner* — Kyle R Grabowski

(57) ABSTRACT

An optical security device suitable for securing or authenticating high security or high value articles of manufacture when affixed thereto, is provided. The inventive security device produces optically variable effects when viewed from varying points of view and is made up of a microstructured layer having image icon elements that have at least one pigmented material. The microstructured layer is arranged relative to an arrangement of focusing elements such that at least portions of the image icon elements are observable through at least portions of the arrangement of focusing elements, thereby providing at least one synthetic image that demonstrates a color-transition effect as points of view from which the optical security device is viewed are changed. In one particular embodiment, the optical security device comprises (i) an arrangement of image icon elements having a first contrasting material pattern and a second contrasting material pattern; (ii) a fixed arrangement of focusing elements disposed relative to the arrangement of image icon elements such that the image icon elements project a synthetic image when viewed through the focusing elements, and having a first fixed org-pattern (as defined herein) that is mismatched from the at least one of the patterns of the first
(Continued)

and second contrasting materials; where the synthetic image is a projection of both the first and second contrasting material when viewed from at least one angle.

12 Claims, 10 Drawing Sheets

Related U.S. Application Data

(60) Provisional application No. 62/515,179, filed on Jun. 5, 2017, provisional application No. 61/971,240, filed on Mar. 27, 2014.

(51) Int. Cl.
  *B42D 25/378* (2014.01)
  *B42D 25/445* (2014.01)
  *B42D 25/45* (2014.01)
  *B42D 25/355* (2014.01)
  *B42D 25/29* (2014.01)

(52) U.S. Cl.
  CPC .............. *B42D 25/45* (2014.10); *B42D 25/29* (2014.10); *B42D 25/355* (2014.10)

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A * | 6/1990 | Fotland ............... G09F 19/14 359/463 |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,413,839 A | 5/1995 | Chatwin et al. |
| 5,433,807 A | 7/1995 | Heckenkamp et al. |
| 5,438,928 A | 8/1995 | Chatwin et al. |
| 5,442,482 A | 8/1995 | Johnson et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,574,083 A | 11/1996 | Brown et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,731,064 A | 3/1998 | Suss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,783,275 A | 7/1998 | Muck et al. |
| 5,800,907 A | 9/1998 | Yumoto |
| 5,810,957 A | 9/1998 | Boswell |
| 5,812,313 A | 9/1998 | Johansen et al. |
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror et al. |
| 6,030,691 A | 2/2000 | Burchard et al. |
| 6,036,230 A | 3/2000 | Farber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,144,795 A | 11/2000 | Dawes et al. |
| 6,176,582 B1 | 1/2001 | Grasnick |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,249,588 B1 | 6/2001 | Amidror et al. |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florezak et al. |
| 6,297,911 B1 | 10/2001 | Nishikawa et al. |
| 6,301,363 B1 | 10/2001 | Mowry, Jr. |

(56) References Cited

U.S. PATENT DOCUMENTS

| | | |
|---|---|---|
| 6,302,989 B1 | 10/2001 | Kaule |
| 6,328,342 B1 | 12/2001 | Belousov et al. |
| 6,329,040 B1 | 12/2001 | Oshima et al. |
| 6,329,987 B1 | 12/2001 | Gottfried et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |
| 6,396,636 B2 | 5/2002 | Sawaki et al. |
| 6,404,555 B1 | 6/2002 | Nishikawa |
| 6,405,464 B1 | 6/2002 | Gulick, Jr. et al. |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,483,644 B1 | 11/2002 | Gottfried et al. |
| 6,500,526 B1 | 12/2002 | Hannington |
| 6,521,324 B1 | 2/2003 | Debe et al. |
| 6,542,646 B1 | 4/2003 | Bar-Vona |
| 6,558,009 B2 | 5/2003 | Hannington et al. |
| 6,587,276 B2 | 7/2003 | Daniell |
| 6,616,803 B1 | 9/2003 | Isherwood et al. |
| 6,618,201 B2 | 9/2003 | Nishikawa et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,926,764 B2 | 8/2005 | Bleikolm et al. |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,359,120 B1 | 4/2008 | Raymond et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2 | 10/2009 | Niemuth |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,744,002 B2 | 6/2010 | Jones et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,820,269 B2 | 10/2010 | Staub et al. |
| 7,830,627 B2 * | 11/2010 | Commander ........ B42D 25/324 359/820 |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,111,463 B2 | 2/2012 | Endle et al. |
| 8,149,511 B2 | 4/2012 | Katlic et al. |
| 8,241,732 B2 | 8/2012 | Hansen et al. |
| 8,284,492 B2 | 10/2012 | Crane et al. |
| 8,367,452 B2 | 2/2013 | Soma et al. |
| 8,514,492 B2 | 8/2013 | Schilling et al. |
| 8,528,941 B2 | 9/2013 | Dorfler et al. |
| 8,537,470 B2 | 9/2013 | Endle et al. |
| 8,557,369 B2 * | 10/2013 | Hoffmuller ............ B42D 25/29 428/195.1 |
| 8,693,101 B2 | 4/2014 | Tomczyk et al. |
| 8,739,711 B2 | 6/2014 | Cote |
| 8,867,134 B2 | 10/2014 | Steenblik et al. |
| 8,906,184 B2 * | 12/2014 | Hoffmann ............ B42D 25/342 156/242 |
| 8,908,276 B2 | 12/2014 | Holmes |
| 9,019,613 B2 | 4/2015 | Raymond et al. |
| 9,132,690 B2 | 9/2015 | Raymond et al. |
| 9,399,366 B2 * | 7/2016 | Hoffmuller .......... B42D 25/342 |
| 9,592,700 B2 | 3/2017 | Raymond et al. |
| 9,701,150 B2 | 7/2017 | Raymond et al. |
| 9,802,437 B2 | 10/2017 | Holmes |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0167485 A1 | 11/2002 | Hedrick |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0065743 A1 | 4/2004 | Doublet |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0247794 A1 | 11/2005 | Jones et al. |
| 2006/0003295 A1 | 1/2006 | Hersch et al. |
| 2006/0011449 A1 | 1/2006 | Knoll |
| 2006/0017979 A1 | 1/2006 | Goggins |
| 2006/0018021 A1 | 1/2006 | Tomkins et al. |
| 2006/0061267 A1 | 3/2006 | Yamasaki et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0164555 A1 | 7/2007 | Mang et al. |
| 2007/0183045 A1 | 8/2007 | Schilling et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0037131 A1 | 2/2008 | Steenblik et al. |
| 2008/0116272 A1 | 5/2008 | Giering et al. |
| 2008/0130018 A1 | 6/2008 | Steenblik et al. |
| 2008/0143095 A1 | 6/2008 | Isherwood et al. |
| 2008/0160226 A1 | 7/2008 | Kaule et al. |
| 2008/0182084 A1 | 7/2008 | Tompkin et al. |
| 2009/0008923 A1 | 1/2009 | Kaule et al. |
| 2009/0061159 A1 | 3/2009 | Staub et al. |
| 2009/0243278 A1 | 10/2009 | Camus et al. |
| 2009/0261572 A1 | 10/2009 | Bleikolm et al. |
| 2009/0290221 A1 | 11/2009 | Hansen et al. |
| 2009/0310470 A1 | 12/2009 | Yrjonen |
| 2009/0315316 A1 | 12/2009 | Staub et al. |
| 2010/0001508 A1 | 1/2010 | Tompkin et al. |

(56) References Cited

U.S. PATENT DOCUMENTS

| | | |
|---|---|---|
| 2010/0018644 A1 | 1/2010 | Sacks et al. |
| 2010/0045024 A1 | 2/2010 | Attner et al. |
| 2010/0068459 A1 | 3/2010 | Wang et al. |
| 2010/0084851 A1 | 4/2010 | Schilling |
| 2010/0103528 A1 | 4/2010 | Endle et al. |
| 2010/0109317 A1 | 5/2010 | Hoffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0277805 A1 | 11/2010 | Schilling et al. |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019283 A1 | 1/2011 | Steenblik et al. |
| 2011/0045255 A1 | 2/2011 | Jones et al. |
| 2011/0056638 A1 | 3/2011 | Rosset |
| 2011/0179631 A1 | 7/2011 | Gates et al. |
| 2012/0019607 A1 | 1/2012 | Dunn et al. |
| 2012/0033305 A1 | 2/2012 | Moon et al. |
| 2012/0091703 A1 | 4/2012 | Maguire et al. |
| 2012/0098249 A1 | 4/2012 | Rahm et al. |
| 2012/0105928 A1 | 5/2012 | Camus et al. |
| 2012/0153607 A1 | 6/2012 | Rahm et al. |
| 2012/0194916 A1 | 8/2012 | Cape et al. |
| 2012/0243744 A1 | 9/2012 | Camus et al. |
| 2013/0003354 A1 | 1/2013 | Meis et al. |
| 2013/0010048 A1 | 1/2013 | Dunn et al. |
| 2013/0038942 A1 | 2/2013 | Holmes |
| 2013/0044362 A1 | 2/2013 | Commander et al. |
| 2013/0056971 A1 * | 3/2013 | Holmes ............... B42D 25/324 283/74 |
| 2013/0069360 A1 * | 3/2013 | Power ................ B42D 25/324 283/85 |
| 2013/0154250 A1 | 6/2013 | Dunn et al. |
| 2013/0154251 A1 | 6/2013 | Jolie |
| 2014/0174306 A1 | 6/2014 | Wening et al. |
| 2014/0175785 A1 | 6/2014 | Katlic et al. |
| 2014/0353959 A1 | 12/2014 | Lochbihler |
| 2014/0367957 A1 | 12/2014 | Jordan |
| 2014/0376091 A1 | 12/2014 | Jordan et al. |
| 2015/0152602 A1 | 6/2015 | Blake et al. |
| 2016/0101643 A1 | 4/2016 | Cape et al. |
| 2016/0176221 A1 | 6/2016 | Holmes |
| 2016/0257159 A1 | 9/2016 | Attner et al. |
| 2016/0325577 A1 | 11/2016 | Jordan |
| 2017/0015129 A1 | 1/2017 | Jordan |
| 2017/0173990 A1 | 6/2017 | Cape et al. |
| 2018/0178577 A1 | 6/2018 | Lister |

FOREIGN PATENT DOCUMENTS

| | | |
|---|---|---|
| CN | 1102865 A | 5/1995 |
| CN | 1126970 C | 11/2003 |
| CN | 1950570 A | 4/2007 |
| CN | 101678664 A | 3/2010 |
| DE | 19804858 A1 | 8/1999 |
| DE | 19932240 A1 | 1/2001 |
| DE | 10100692 B4 | 8/2004 |
| DE | 102011114750 A1 * | 4/2013 ......... B60H 1/00278 |
| DE | 102011115125 A1 | 4/2013 |
| EP | 90130 A1 | 10/1983 |
| EP | 92691 A2 | 11/1983 |
| EP | 118222 A1 | 9/1984 |
| EP | 156460 A1 | 10/1985 |
| EP | 203752 A2 | 12/1986 |
| EP | 253089 A1 | 1/1988 |
| EP | 318717 A2 | 6/1989 |
| EP | 415230 A2 | 3/1991 |
| EP | 439092 A2 | 7/1991 |
| EP | 319157 B1 | 7/1992 |
| EP | 801324 A1 | 10/1997 |
| EP | 887699 A1 | 12/1998 |
| EP | 930174 A2 | 7/1999 |
| EP | 1356952 A2 | 10/2003 |
| EP | 1002640 B1 | 5/2004 |
| EP | 997750 B1 | 5/2005 |
| EP | 1538554 A2 | 6/2005 |
| EP | 1354925 B1 | 4/2006 |
| EP | 1743778 A2 | 1/2007 |
| EP | 1801636 A1 | 6/2007 |
| EP | 1876028 A1 | 1/2008 |
| EP | 1897700 A2 | 3/2008 |
| EP | 1931827 B1 | 4/2009 |
| EP | 2335937 A1 | 6/2011 |
| EP | 2338682 A1 | 6/2011 |
| EP | 2162294 B1 | 3/2012 |
| ET | 1659449 A2 | 5/2006 |
| FR | 2803939 A1 | 7/2001 |
| FR | 2952194 A1 | 5/2011 |
| FR | 3018474 A1 | 9/2015 |
| GB | 1095286 A | 12/1967 |
| GB | 2103669 A | 2/1983 |
| GB | 2168372 A | 6/1986 |
| GB | 2227451 A | 8/1990 |
| GB | 2362493 A | 11/2001 |
| GB | 2395724 A | 6/2004 |
| GB | 2433470 A | 6/2007 |
| GB | 2490780 A | 11/2012 |
| JP | S41-4953 Y1 | 3/1966 |
| JP | S46-22600 Y1 | 8/1971 |
| JP | H04-234699 A | 8/1992 |
| JP | H05-508119 A | 11/1993 |
| JP | H10-35083 A | 2/1998 |
| JP | H10-39108 A | 2/1998 |
| JP | H11-501590 A | 2/1999 |
| JP | H11-189000 A | 7/1999 |
| JP | 2000-056103 A | 2/2000 |
| JP | 2000-233563 A | 8/2000 |
| JP | 2000-256994 A | 9/2000 |
| JP | 2001-055000 A | 2/2001 |
| JP | 2001-516899 A | 10/2001 |
| JP | 2001-324949 A | 11/2001 |
| JP | 2002-169223 A | 6/2002 |
| JP | 2003-039583 A | 2/2003 |
| JP | 2003-165289 A | 6/2003 |
| JP | 2003-528349 A | 9/2003 |
| JP | 2003-326876 A | 11/2003 |
| JP | 2004-163530 A | 6/2004 |
| JP | 2004-262144 A | 9/2004 |
| JP | 2004-317636 A | 11/2004 |
| JP | 2005-193501 A | 7/2005 |
| JP | 2009-536885 A | 10/2009 |
| JP | 2009-262375 A | 11/2009 |
| JP | 2009-274293 A | 11/2009 |
| JP | 2011-502811 A | 1/2011 |
| JP | 2013-537640 A | 10/2013 |
| JP | 2014-514177 A | 6/2014 |
| KR | 10-0194536 B1 | 6/1999 |
| KR | 20-0217035 Y1 | 3/2001 |
| KR | 20-0311905 Y1 | 5/2003 |
| KR | 10-0544300 B1 | 1/2006 |
| KR | 10-0561321 B1 | 3/2006 |
| KR | 10-2008-0048578 A | 6/2008 |
| RU | 2111125 C1 | 5/1998 |
| RU | 2245566 C2 | 1/2005 |
| RU | 2010101854 A | 7/2011 |
| TW | 575740 B | 2/2004 |
| WO | WO92008998 A1 | 5/1992 |
| WO | WO92019994 A1 | 11/1992 |
| WO | WO93024332 A1 | 12/1993 |
| WO | WO96035971 A2 | 11/1996 |
| WO | WO97019820 A1 | 6/1997 |
| WO | WO97044769 A1 | 11/1997 |
| WO | WO98013211 A1 | 4/1998 |
| WO | WO98015418 A1 | 4/1998 |
| WO | WO98026373 A1 | 6/1998 |
| WO | WO99014725 A1 | 3/1999 |
| WO | WO99023513 A1 | 5/1999 |
| WO | WO99026793 A1 | 6/1999 |
| WO | WO99066356 A1 | 12/1999 |
| WO | WO01007268 A1 | 2/2001 |
| WO | WO01011591 A1 | 2/2001 |

(56) References Cited

FOREIGN PATENT DOCUMENTS

| WO | WO01039138 A1 | 5/2001 |
|---|---|---|
| WO | WO01053113 A1 | 7/2001 |
| WO | WO01063341 A1 | 8/2001 |
| WO | WO01071410 A2 | 9/2001 |
| WO | WO02040291 A2 | 5/2002 |
| WO | WO02043012 A1 | 5/2002 |
| WO | WO02101669 A2 | 12/2002 |
| WO | WO03005075 A1 | 1/2003 |
| WO | WO03007276 A1 | 1/2003 |
| WO | WO03022598 A2 | 3/2003 |
| WO | WO03053713 A1 | 7/2003 |
| WO | WO03061980 A1 | 7/2003 |
| WO | WO03061983 A1 | 7/2003 |
| WO | WO03082598 A1 | 10/2003 |
| WO | WO03098188 A1 | 11/2003 |
| WO | WO2004022355 A2 | 3/2004 |
| WO | WO2004036507 A2 | 4/2004 |
| WO | WO2004087430 A1 | 10/2004 |
| WO | 2005052650 A2 | 6/2005 |
| WO | WO2005106601 A2 | 11/2005 |
| WO | WO2006029744 A1 | 3/2006 |
| WO | WO2007076952 A2 | 7/2007 |
| WO | WO2007133613 A2 | 11/2007 |
| WO | WO2008049632 A1 | 5/2008 |
| WO | WO2009000527 A1 | 12/2008 |
| WO | WO2009000528 A1 | 12/2008 |
| WO | WO2009000529 A2 | 12/2008 |
| WO | WO2009000530 A2 | 12/2008 |
| WO | WO2009118946 A1 | 10/2009 |
| WO | WO2009121784 A2 | 10/2009 |
| WO | WO2010015383 A1 | 2/2010 |
| WO | WO2010094691 A1 | 8/2010 |
| WO | WO2010099571 A1 | 9/2010 |
| WO | WO2010113114 A2 | 10/2010 |
| WO | WO2010136339 A2 | 12/2010 |
| WO | WO2011012460 A2 | 2/2011 |
| WO | WO2011015384 A1 | 2/2011 |
| WO | WO2011019912 A1 | 2/2011 |
| WO | WO2011044704 A1 | 4/2011 |
| WO | WO2011051669 A1 | 5/2011 |
| WO | WO2011107791 A1 | 9/2011 |
| WO | WO2011107793 A1 | 9/2011 |
| WO | WO2011122943 A1 | 10/2011 |
| WO | WO2012027779 A1 | 3/2012 |
| WO | WO2012103441 A1 | 8/2012 |
| WO | WO2012121622 A1 | 9/2012 |
| WO | WO2013028534 A1 | 2/2013 |
| WO | WO2013093848 A1 | 6/2013 |
| WO | WO2013098513 A1 | 7/2013 |
| WO | WO2015148878 A2 | 10/2015 |
| WO | WO2016063050 A1 | 4/2016 |
| WO | WO2016149760 A1 | 9/2016 |

OTHER PUBLICATIONS

Amidror, "A Generalized Fourier-Based Method for the Analysis of 2D Moiré Envelope-Forms in Screen Superpositions", Journal of Modern Optics (London, GB), vol. 41, No. 9, Sep. 1, 1994, pp. 1837-1862, ISSN: 0950-0340.

Article: "Spherical Lenses" (Jan. 18, 2009); pp. 1-12; retrieved from the Internet: URL:http://www.physicsinsights.org/simple_optics_spherical_lenses-1.html.

Drinkwater, K. John, et al., "Development and applications of Diffractive Optical Security Devices for Banknotes and High Value Documents", Optical Security and Counterfeit Deterrence Techniques III, 2000. pp. 66-79, SPIE vol. 3973, San Jose, CA.

Dunn, et al., "Three-Dimensional Virtual Images for Security Applications", Optical Security and Counterfeit Deterrence Techniques V, (published Jun. 3, 2004), pp. 328-336, Proc. SPIE 5310.

Fletcher, D.A. et al., "Near-field infrared imaging with a microfabricated solid immersion lens", Applied Physics Letters, Oct. 2, 2000, pp. 2109-2111, vol. 77, No. 14.

Gale, M. T., et al., Chapter 6—Replication, Micro Optics: Elements, Systems and Applications, 1997, pp. 153-177.

Hardwick, Bruce and Ghioghiu Ana, "Guardian Substrate As An Optical Medium for Security Devices", Optical Security and Counterfeit Deterrence Techniques III, 2000, pp. 176-179, SPIE vol. 3973, San Jose, CA.

Helmut Kipphan (ed.), "Section 2.2 Gravure Printing", Handbook of Print Media: Technologies and Production Methods, 2001, pp. 369-371, Heidelberger Druckmaschinen AG, Germany.

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Lippmann, G., "Photgraphie—Épreuves Réversibles, Photographies Intégrals", Académie des Sciences, 1908, pp. 446-451, vol. 146, Paris.

Liu, S., et al., "Artistic Effects and Application of Moiré Patterns in Security Holograms", Applied Optics, Aug. 1995, pp. 4700-4702, vol. 34, No. 22.

Muke, "Embossing of Optical Document Security Devices", Optical Security and Counterfeit Deterrence Techniques V, (published Jun. 3, 2004), pp. 341-349, Proc. SPIE 5310.

Phillips, Roger W., et al., Security Enhancement of Holograms with Interference Coatings, Optical Security and Counterfeit Deterrence Techniques III, 2000, pp. 304-316, SPIE vol. 3973, San Jose, CA.

Steenblik, Richard A., et al., UNISON Micro-optic Security Film, Optical Security and Counterfeit Deterrence Techniques V, 2004, pp. 321-327, SPIE vol. 5310, San Jose, CA.

Van Renesse, Rudolf L., Optical Document Security, 1993, Artech House Inc., Norwood, MA.

Van Renesse, Rudolf L., Optical Document Security, 1998, 2nd edition, pp. 232-235, 240-241 and 320-321, Artech House Inc., Norwood, MA (ISBN 0-89006-982-4).

Van Renesse, Rudolf L., Optical Document Security, 2005, 3rd edition, pp. 62-169, Artech House Inc., Norwood, MA (ISBN 1-58053-258-6).

Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.

Zhang, X., et al., "Concealed Holographic Coding for Security Applications by Using a Moiré Technique", Applied Optics, Nov. 1997, pp. 8096-8097, vol. 36, No. 31.

Office Action dated Jan. 18, 2019 in connection with Indonesia Patent Application No. P00201607186, 6 pages.

Office Action dated Feb. 3, 2019 in connection with Chinese Patent Application No. 201580027596.7, 58 pages.

Office Action dated Nov. 27, 2018 in connection with Japanese Patent Application No. 2017-502936, 7 pages.

International Preliminary Report on Patentability for International Application No. PCT/US2018/035183, dated Dec. 19, 2019, 9 pages.

Egyptian Patent Office, "Technical Report," Application No. EG2016091551, dated Oct. 23, 2019, 10 pages.

Intellectual Property India, "Examination report under sections 12 & 13 of the Patents Act, 1970 and the Patents Rules, 2003," Application No. IN201617035309, dated Nov. 28, 2019, 10 pages.

Brazil National Institute of Industrial Property, "Search Report," Application No. 112017000914-5, dated Mar. 24, 2020, 8 pages.

Japan Patent Office, "Decision of Refusal," Application No. JP 2017-502818, dated Mar. 3, 2020, 5 pages.

IMPI—Mexican Institute of Industrial Property, Office Action in connection with Mexican Application No. MX/a/2016/012305, dated Jan. 17, 2020, 6 pages.

(56) References Cited

OTHER PUBLICATIONS

China National Intellectual Property Administration, "Second Office Action," Application No. 2,N201810391431.3, dated May 7, 2020, 20 pages.
China National Intellectual Property Administration, "Third Office Action," Application No. 201810391917.7, dated May 15, 2020, 7 pages.

* cited by examiner

OPTICAL DEVICE THAT PROVIDES FLICKER-LIKE OPTICAL EFFECTS

CROSS-REFERENCE TO RELATED APPLICATIONS

This application claims the benefit of U.S. Provisional Patent Application Ser. No. 62/515,179 filed Jun. 5, 2017, and is a continuation-in-part of U.S. patent application Ser. No. 15/129,438 filed Sep. 27, 2016, which claims the benefit of International Application No. PCT/US2015/022907 filed Mar. 27, 2015 and U.S. Provisional Patent Application Ser. No. 61/971,240 filed Mar. 27, 2014, which are all hereby incorporated herein by reference in their entirety.

TECHNICAL FIELD

The instant invention generally relates to a security device suitable for securing or authenticating high security or high value articles of manufacture when affixed thereto. The present security device produces optically variable effects when viewed from varying points of view thereby rendering certain popular counterfeiting techniques, such as photocopying, ineffective. More particularly, the present invention relates to an optical security device comprising an arrangement of micro-images—formed by arrangements of image icon elements—that have at least one pigmented material. The arrangement of image icon elements is arranged relative to an arrangement of focusing elements such that at least portions of the arrangement of image icon elements are observable through at least portions of the arrangement of focusing elements, thereby providing at least one synthetic image that demonstrates a color-transition effect as points of view from which the optical security device is viewed are changed.

BACKGROUND

Optical security devices generally include at least two components: an arrangement of image icon elements and an arrangement of focusing elements. These components are disposed relative to each other such that they cooperate to produce a synthetic image when the arrangement of image icon elements or portions thereof are viewed through the arrangement of focusing elements or portions thereof. As used herein, all references to arrangements of image icon elements or focusing elements shall be understood to include reference to all of the elements in the arrangement or portions thereof, unless otherwise specified. Such devices may include an optical spacer disposed between the arrangement of image icon elements and the arrangement of focusing elements.

Such optical security devices enjoy high efficiency as anti-counterfeit technologies due largely in part to their diversity of visual effects, the complexity of the construction of such devices, the expense of the equipment, tooling and processes employed in their manufacture and the dynamic visual effects they produce. For example, optical security devices such as those described above often take a micro-structure approach to manufacture, where the arrangement of image icon elements is produced by forming micro-structured icon elements in a radiation cured liquid polymer material. These icon elements often take the form of microscopic voids or recesses formed in a polymeric material. Correspondingly, the arrangement of focusing elements is produced by forming microscopic lenses (hereinafter "lenses" or "micro-lenses") in a radiation cured polymer. This often involves the arrangement of image icon elements and the arrangement of focusing elements being disposed on opposing sides of an optical spacer. The voids are then filled and/or coated with a contrasting material that provides color, reflective, refractive, diffractive or textured contrast (i.e., pigmented or metallic and/or reflective materials) for the voids, or portions thereof, compared to surrounding or neighboring regions in the arrangement of image icon elements.

Examples of optical security devices formed from a micro-structured approach are provided in U.S. Pat. Nos. 7,333,268 and 7,468,842. While these patents describe a micro-structured approach to forming the icon elements, where the icon elements are filled and/or coated, the filling/coating material is cured or otherwise solidified by non-directionally curing the filled/coated icon elements. The means of curing in these references is either applied directly (i.e., not through an optical spacer, arrangement of focusing elements, or other structural components of the optical security device) to the arrangement of image icon elements or is applied without the use of any directionally focused light such as collimated light. Such structures allow for large color blocks to be formed. However, while the synthetic images of such devices are viewable over a wide range of angles, color changes are more difficult to achieve and control.

To facilitate the cooperation of the arrangement of focusing elements with the arrangement of icon elements, these components are precisely aligned such that the viewing of the arrangement of image icon elements through the arrangement of focusing elements will produce a synthetic image. Such requirements for precise alignment of the arrangement of image icon element and the arrangement of focusing elements both relative to each other and across any optical spacer which may be present, adds to the complexity of the process of manufacture but limits the diversity of dynamic effects that can be produced. For example, such stringent alignment limitations often prevent the use of multiple contrasting materials such that an arrangement of micro-structured icon elements can produce synthetic images that vary in color.

Attempts have been made to improve the efficiency of these optical security devices; particularly as it relates to the use of micro-structured image icon elements to generate colorshifting images. For example, International Patent Application No. PCT/US2015/022907 provides what are described therein as flicker-like optical effects. Here, the micro-structured image icon elements are formed by forming voids in the polymeric material, applying a contrasting material to the voids, and then directionally curing these image icon elements; more specifically, curing the contrasting materials that are part of the image icon elements. To cure these image icon elements, collimated light is directed through an arrangement of focusing elements toward the arrangement of icon elements such that the collimated light impinges on the contrasting material thereby producing a pattern of cured contrasting material. This pattern is determined by the arrangement pattern of the arrangement of focusing elements and the cure angle (e.g., the angle at which collimated light impacts the lenses). Here, the arrangement of focusing elements is disposed relative to the arrangement of image icon elements such that when the collimated light is passed through the individual focusing elements at a desired angle, a pattern of cured contrasting material is generated in the arrangement of image icon elements. This pattern of cured contrasting material correlates to the arrangement pattern of the focusing elements in the arrangement of focusing elements such that the synthetic image produced by the pattern of cured contrasting material is observable only when viewed, at the cure angle, through the focusing elements. Another pattern of cured contrasting material may also be generated by washing out the uncured contrasting material to leave an uncured area in the voids, which are then filled with another contrasting material (i.e., different color, different material, or different texture). This other contrasting material can then be directionally cured by directing the collimated light, at a second and different cure angle, through the same arrangement of focusing elements thereby creating another pattern of cured contrasting material that correlates to the arrangement pattern of the arrangement of focusing elements. Again, the synthetic image produced by the other pattern of cured contrasting material is observable only when the arrangement of icon elements are viewed through the focusing elements at the second cure angle. While this allows for alignment of the arrangement of focusing elements with the arrangement of cured image icon elements and allows for the color of the synthetic images to change as the point of view changes, there remain some significant deficiencies.

For example, such an optical security device is limited in that the synthetic image generated can only be observed at the particular cure angles. Accordingly, the transition (e.g., color shift) from one contrasting material to another is not a smooth transition as an observer will notice the "snap" effect, for example, when a synthetic image is changed from one color to another. This snap effect leaves the security device susceptible to counterfeiters. Moreover, this single color limitation makes such devices more susceptible to counterfeiters.

SUMMARY

Heretofore, there remained a need for an optical security device with improved security features and optical effects. In particular, there remained a need for an optical security device which provides a synthetic image having a smooth transition from one color to another.

In a first aspect, the present invention is a method of forming an optical security device. In one particular embodiment, the method of forming the optical security device comprises (i) providing a first sacrificial arrangement of focusing elements disposed over an arrangement of image icon elements; (ii) forming a first contrasting material pattern and a second contrasting material pattern on or in the image icon elements by directionally curing at a first cure angle, through the sacrificial arrangement of focusing elements, at least the first contrasting material on or in the image icon elements; (iii) disposing a fixed arrangement of focusing elements over the arrangement of image icon elements such that the image icon elements project a synthetic image when viewed through the fixed arrangement of focusing elements; wherein the fixed arrangement of focusing elements has a first fixed org-pattern that forms a lens-icon pattern mismatch between the first fixed pattern and the patterns of the first and second contrasting materials and the sacrificial arrangement of focusing elements has a first sacrificial org-pattern that is matched with the first contrasting material pattern at the first cure angle; wherein the synthetic image is a projection of both the first and second contrasting material when viewed from at least one angle; and wherein the synthetic image produces a color-transition effect which corresponds to a shift in viewing angle. The term "org-pattern", as used herein, refers to the particular skew, lens pitch, lens size, lens shape, lens phase shift, lens material, lens opacity, lens masking, or any combination thereof of the sacrificial or fixed focusing element arrangement. In a further embodiment, the synthetic image produces a color-transition effect which corresponds to a shift in viewing angle. Various other embodiments, including without limit those described elsewhere herein, are also contemplated within the scope of the present invention.

In a second aspect, the present invention is an optical security device. In one particular embodiment, the optical security device comprises (i) an arrangement of image icon elements having a first contrasting material pattern and a second contrasting material pattern; (ii) a fixed arrangement of focusing elements disposed relative to the arrangement of image icon elements such that the image icon elements project a synthetic image when viewed through the focusing elements, and having a first fixed org-pattern that is mismatched from the at least one of the patterns of the first and second contrasting materials; wherein the synthetic image is a projection of both the first and second contrasting material when viewed from at least one angle. In a further embodiment, the synthetic image produces a color-transition effect which corresponds to a shift in viewing angle. Various other embodiments, including without limit those described elsewhere herein, are also contemplated within the scope of the present invention.

Further aspects of the invention include sheet materials, documents, articles of clothing and various other articles of manufacture having an optical security device, as described herein, being incorporated therewith.

The invention will now be further described herein such that a person having ordinary skill in the art (PHOSITA) may be able to make and use the invention without having to resort to undue experimentation.

BRIEF DESCRIPTION OF THE DRAWINGS

Particular features of the disclosed invention are illustrated by reference to the accompanying drawings in which:

FIG. 3 is a cross-sectional side view of the optical security device with a sacrificial arrangement of focusing elements, a first film, and an arrangement of image icon elements before a fixed arrangement of focusing elements has been added and before any pigmented material has been added to the image icon elements;

FIG. 4 is the optical security device shown in FIG. 3, where voids in the image icon arrangement are shown filled with a first pigmented material and incident light in the form of parallel rays is shown impinging on the sacrificial arrangement of focusing elements at a cure angle that is normal to its base surface;

FIG. 5 is the optical security device shown in FIG. 4, where uncured first pigmented material has been removed from the image icon elements leaving only the cured portion of the first pigmented material and the empty areas (i.e., recreated voids) behind;

FIG. 6 is the optical security device shown in FIG. 5, where recreated voids are shown filled with a second pigmented material, and collimated light is shown impinging on the focusing element arrangement at a different cure angle;

FIG. 7 is the optical device shown in FIG. 6, where the uncured second pigmented material has been removed from the image icon layer leaving the first cured pattern and second cured pattern of contrasting materials and empty areas behind;

FIG. 8 is the optical security device shown in FIG. 7, where recreated voids are shown filled with a third pigmented material, and non-collimated (scattered) light is shown impinging on the focusing element arrangement;

FIG. 9 is a cross-sectional side view of the exemplary embodiment of the optical security device of the present invention before a permanent or fixed focusing element arrangement has been added, the device being prepared in accordance with the method depicted in FIGS. 3-8. The device has three different contrasting materials, two of which were directionally cured;

DETAILED DESCRIPTION

Figure 1:
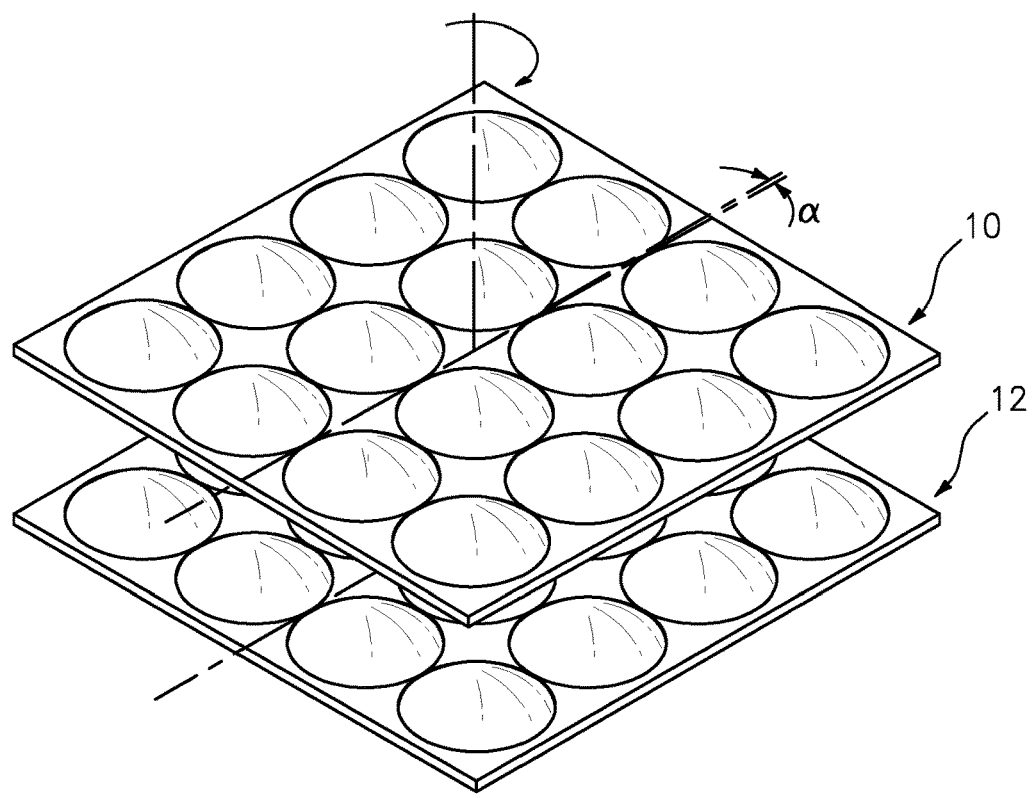
FIG. 1 is a top planar side view of a sacrificial arrangement of focusing elements (spherical or aspherical lens arrangement) shown rotated by a slight angle ($\alpha$) of 1 degree or less from a final or permanent arrangement of focusing elements (spherical or aspherical lens arrangement)

The terms "coat", "coated" or "coating", as used herein, refers to applying a contrasting material to the recessed surface of a void or recess having a total depth such that the material occupies less than 50% of the total depth of the void. The coating is a thin layer that may be applied to voids and/or posts and can be applied over the entire recessed surface or over the entire posts. Alternatively, it is also contemplated that embodiments where the coating is applied in a pattern are also within the scope of the instant invention.

The term "cure angle" or "curing angle", as used herein, refers to the angle, relative to normal, at which the source of curing the contrasting material impinges upon the arrangement of focusing elements before traveling towards the arrangement of image icon elements to cure at least portions of the arrangement of image icon elements.

The term "cured pattern", as used herein, refers to a pattern of cured contrasting material that is formed as a result of curing contrasting material portions of the arrangement of image icon elements. These cured portions of the contrasting material are distributed in/on the microstructured layer as part of the arrangement of image icon elements.

The term "directional curing" or "directionally curing", as used herein, refers to the process of curing portions of an arrangement of image icon elements at a specified curing angle through an arrangement of focusing elements thereby ensuring that when the viewing angle and the curing angle are equivalent, the cured portions of the arrangement of image icon element when viewed through that arrangement of focusing elements, will project a synthetic image.

The term "empty areas", as used herein, refers to portions of the microstructured layer in/on which there is no directionally cured pigmented material and may refer to areas within or between voids, or on or adjacent to posts. These areas may form part of a fixed pattern of image icon elements and may or may not be subsequently coated with a pigmented, metallic, reflective or other material.

The terms "fill", "filled", or "filling", as used herein, refers to the application of a contrasting material to a void or recess having a total depth such that the contrasting material occupies 50% or more of the total depth of the void.

The term "fixed icon pattern", as used herein, refers to the pattern of image icon elements observable through the fixed arrangement of focusing elements at the cure angles. This fixed pattern is different from the sacrificial pattern and this mismatch is due to the mismatch of the fixed arrangement and the sacrificial arrangement of focusing elements (at the time of directional curing) relative to the arrangement of image icon elements.

The term "fixed lens pattern", as used herein, refers to the arrangement pattern of the fixed arrangement of focusing elements and may relate to pitch, skew angle, or phase shift.

The term "fixed synthetic image", as used herein, refers to the synthetic image projected by the arrangement of image icon elements when viewed through the fixed arrangement of focusing elements.

The term "fixed viewing angle", as used herein, refers to a viewing angle, relative to normal, from which the arrangement of image icon elements are viewed through the fixed arrangement of focusing elements.

The term "flood cure", as used herein, refers to the act of curing in a non-discriminate manner such that a specific cure angle is not targeted for curing the targeted material.

The term "lens-icon mismatch", as used herein, means that at least one of the fixed org-patterns and one of the sacrificial org-patterns is different so that at least one of the contrasting material patterns formed by directional curing, through the sacrificial arrangement of focusing elements, does not correlate to the fixed arrangement of focusing elements.

The term "pattern", as used herein, refers to the repeated sequence of one or more features such as pitch, size, color, material, shape, over an arrangement of focusing elements or image icons.

The term "phase shift", as used herein, refers to the change of pattern over an arrangement of image icons or focusing elements, whereby a first section of the arrangement has a pattern that is different from the pattern of another.

The term "recesses", as used herein, refers to gaps in the microstructured layer forming micro-structured indicia and having a determined depth that does not extend through the full depth of the microstructured layer. These gaps may be nano-sized, micro-sized, macro-sized or a combination thereof.

The term "sacrificial pattern", as used herein, refers to the arrangement pattern of the sacrificial arrangement of focusing elements and may relate to pitch, skew angle, or phase shift.

The term "sacrificial synthetic image", as used herein, refers to the synthetic image projected by the arrangement of image icon elements when viewed though the sacrificial arrangement of focusing elements.

The term "sacrificial viewing angle", as used herein, refers to a viewing angle, relative to normal, from which the arrangement of image icon elements are viewed through the sacrificial arrangement of focusing elements.

The term "voids", as used herein, refer to gaps in the microstructured layer forming micro structured indicia (i.e., images, numbers, symbols, text) and having a determined depth that extends through the full depth (i.e., through-holes) of the microstructured layer. These gaps may be nano-sized, micro-sized, macro-sized or a combination thereof and embodiments herein referring to voids may also be interchanged with recesses.

This detailed description is hereby provided for the purpose of describing the invention such that a PHOSITA may be able to practice the invention. Embodiments provided herein are therefore exemplary and shall not be construed as Applicant's intention to limit the scope of the claim to these particularly described embodiments.

Reference to certain publications as prior art shall not be construed as Applicant's acquiescence that such publications are indeed prior art for purposes of novelty, obviousness or inventive step. Such references and the embodiments presented therein are to be understood solely as examples of alternatives to the present invention.

The present inventors have discovered an optical security device, a method of producing this device and various uses for such an optical security device that heretofore had not been used, contemplated or disclosed. The optical security device includes an arrangement of image icon elements and an arrangement of focusing elements that are disposed relative to each other such that at least portions of the arrangement of image icon elements project a synthetic image when viewed through at least portions of the arrangement of focusing elements. To avoid at least some of the above-identified limitations of prior optical security devices, portions of the arrangement of image icon elements were directionally cured through a sacrificial arrangement of focusing elements. For reasons that will be discussed further, this was found surprisingly effective in providing an optical security device which modulates the need for large color blocks and which renders the color-transition effect of such devices smoother, faster, less choppy and without displaying the "snap" effect associated with prior devices.

By directionally curing the contrasting material, which forms part of the arrangement of image icon elements, through a sacrificial arrangement of focusing elements having a sacrificial org-pattern, a first cured contrasting material pattern and a second contrasting material pattern are produced in the arrangement of image icon elements. The arrangement of image icon elements projects a sacrificial synthetic image when the first and/or second contrasting material patterns are viewed through the sacrificial arrangement of focusing elements. At least the first cured contrasting material pattern corresponds to the sacrificial org-pattern of the sacrificial arrangement of focusing elements and the cure angle. By providing a fixed arrangement of focusing elements having a fixed org-pattern different from the sacrificial org-pattern and disposing this fixed arrangement of focusing elements over the arrangement of image icon elements, a lens-icon mismatch is created between the fixed org-pattern and the contrasting material patterns created through the sacrificial arrangement of focusing elements. Where the sacrificial arrangement of focusing elements remains or is integrated into the system, the fixed arrangement of focusing elements also creates lens-lens mismatch between the fixed pattern and the sacrificial pattern in addition to a lens-icon mismatch. As such, when the arrangement of image icons are viewed through the fixed arrangement of focusing elements even from an angle equivalent to the cure angle, both the first and second contrasting material patterns contribute to the synthetic image that is projected through the fixed arrangement of focusing elements. There is at least one fixed viewing angle through which both the first and second contrasting material patterns contribute to the projected synthetic image, thereby enabling a smoother color-transition effect between synthetic images projected from the first contrasting material pattern and that projected from any additional contrasting material pattern (e.g., the second contrasting material pattern). Because the fixed arrangement of focusing elements has a fixed org-pattern that is mismatched from the sacrificial pattern of the sacrificial arrangement of focusing elements used in the directional curing of the arrangement of image icon elements, when viewing the cured pattern of image icon elements through the fixed arrangement of focusing elements, the resulting fixed synthetic image will be different from the sacrificial synthetic image which would have been observable through the sacrificial arrangement of focusing elements.

In one aspect the invention is a method of forming an optical security device by (i) providing a first sacrificial arrangement of focusing elements disposed over an arrangement of image icon elements; (ii) forming a first contrasting material pattern and a second contrasting material pattern on or in the image icon elements by directionally curing at a first cure angle, through the sacrificial arrangement of focusing elements, at least the first contrasting material on or in the image icon elements; (iii) disposing a fixed arrangement of focusing elements over the arrangement of image icon elements such that the image icon elements project a fixed synthetic image when viewed through the fixed arrangement of focusing elements; wherein the fixed arrangement of focusing elements has a first fixed pattern that forms a lens-icon pattern mismatch between the first fixed pattern and the patterns of the first and second contrasting materials and the sacrificial arrangement of focusing elements has a first sacrificial pattern that is matched with the first contrasting material pattern at the first cure angle; wherein the synthetic image is a projection of both the first and second contrasting material patterns when viewed from at least one angle through the fixed arrangement of focusing elements. In a further embodiment, the fixed synthetic image produces a color-transition effect corresponding to shifts in fixed viewing angles.

The resulting optical security device has an arrangement of image icon elements with at least one directionally cured contrasting material pattern. This optical security device produces synthetic images that are projected by multiple contrasting material patterns at one or more viewing angles. This allows a smooth color-transition effect from one contrasting material pattern to another. Preferably, this multiple contrasting material pattern effect is observable at two or more viewing angles such that the combination of the contrasting elements at a first angle produces a first color while at another viewing angle, they combine to produce a different color.

Image Icon Elements

In certain embodiments of the method and the optical security device described herein it is contemplated that a sacrificial arrangement of focusing elements disposed over an arrangement of image icon elements is provided.

As noted above, the optical security device of the present invention comprises, in part, an arrangement of image icon elements integrated as a microstructured array in a microstructured layer. Suitable microstructured layers are generally described in U.S. Pat. Nos. 7,333,268 and 7,468,842. For example, in one embodiment, the microstructured layer includes an array of image icon elements that are adjusted as desired by size, shape, depth, height, width. This microstructured layer may comprise any material suitable for forming micro-sized image icon elements therein. As such the image icon elements contemplated within the scope of the present invention include embodiments where the image icon elements are formed on or in a microstructured layer. These image icon elements, as mentioned above may take the form of various sizes or shapes. For example, the image icon elements may be in the form of gaps formed in a microstructured layer or posts (e.g., mesas or protrusions) formed on or in a microstructured layer or the array of image icon elements may be a combination of gaps and posts. These gaps will be surrounded by microstructured solid regions. Together these gaps, posts, solid regions are combined to form microstructured indicia including but not limited to, text, numbers, symbols, or portraits.

Materials suitable for forming the microstructured layer may be any malleable material which gaps or posts may be integrated on or in. Such material is preferably a polymeric material; more preferably a curable polymeric material and still more preferably a material that is radiation curable.

In certain embodiments described herein, the microstructured layer is formed by casting a liquid polymer against a base film, such as 75 gauge adhesion-promoted polyethylene terephthalate (PET) film, then creating voids in the layer by applying a patterned impression in the polymer and then curing the material such that a pattern of voids and/or posts are present in the microstructured layer. Alternatively, it is also possible and contemplated within the scope of the present invention to cure the polymer and then remove sections of the cured polymer to form a pattern of voids therein.

Voids, as described throughout herein, are gaps in a layer that is otherwise substantially planar or, if not substantially planar, is otherwise substantially uniform in its surface topography, such that the gaps form their own pattern in the layer. In alternative embodiments, whether the microstructured layer is polymeric or another type, the voids extend only partially through the depth of the microstructured layer; or the voids extend through the entire depth of the microstructured layer; or there is a combination of void types where at least one void extends through a partial depth and voids where at least one extends through a full depth of the microstructured layer. The voids described herein, may take any shape, including but not limited to, a U-shaped, V-shaped, or rectangular-shaped voids. While the depth of these voids may vary and be adapted to the PHOSITA's purpose, it has been surprisingly found that for the present invention, depths of from about 0.5 to about 8 μm in total depth are preferred. For example the directional curing required for the present invention is rendered partly ineffective when outside of this range. For instance, a void having a depth greater than 8 microns renders the directional curing ineffective as the directionally cured material tends to cure in a tapered manner thereby limiting the options for focusing elements and refractive indices that can be used to focus on the image icon elements. If the voids or posts are too short, less than 0.5 μm, then the directional curing tends to scatter through a broader cross-section of the image icon elements thereby deteriorating the resolution by deforming the cured segments of contrasting materials.

In one embodiment, the image icon elements are formed as posts integrated with a microstructured layer, such as where the posts are affixed on a microstructured layer or they are formed in the microstructured layer as microstructured layer material that is present between void regions; or some combination of the two. These posts may be affixed on a layer by print or may be formed by the identical process used for forming the voids as described above. Moreover, it is also contemplated that one or more of the posts are formed from one or more pigmented or unpigmented materials and preferably have a total height ranging from about 0.5 to about 8 μm. Similar to voids, the height range of the posts is important. For example, in exemplary embodiments in which the image icon elements are colored posts, the taller that the posts are, the more contrast between the colored synthetic images and the clear background. If the posts are less than 0.5 microns tall, the contrast would be much too low to see the synthetic images very well, even with a high pigment loading. Above 8 microns, the icon elements would be very difficult to manufacture, as the posts in the icon layer would be susceptible to damage during manufacturing. Also, although the contrast increases with higher icon depths or heights, this is only true, up to a point. The contrast gain is a situation of diminishing returns, where at some point a deeper or taller icon will not result in better contrast but would just add thickness to the final product. Where the image icon elements are voids, in one embodiment these voids are partially or completely coated, partially or completely filled with one or more pigmented materials, or coated or filled with one or more unpigmented materials. Fill as used herein is distinguished from a coating in that a filling occupies more than 50% of the depth of a void while a coating occupies 50% or less. A complete fill or coat as used herein is distinguished from a partial fill or coat in that for a complete fill or coat the full surface area of the void's sides and base are occupied by the filling or coating material. This filling or coating material provides a contrast between the voids and the background or surrounding solid regions. Alternatively, it is also contemplated that the contrast is provided by coating the background or surrounding solid regions. In a preferred embodiment, it has been found that by coating or filling the voids, an improved contrast is provided because of the depth of the voids. However, where ease of manufacture is a concern, it has been found that by coating the surrounding areas, the manufacturability of the system improves. It is also contemplated that the voids and surrounding solid regions, or posts and background or surrounding planar or void regions are coated/filled with different materials such that contrast is evident between the voids and surrounding regions or between the posts and surrounding regions. The fillings/coatings may be pigmented or unpigmented materials. Preferably, materials used to coat the solid regions are contrasting materials that provide some contrast, relative to the voids, in terms of pigment/color, reflection, refraction or diffraction. Preferably, the surrounding areas are coated with one or more contrasting (i.e., relative to each pigmented material) pigmented materials or one or more identical (i.e., relative to each pigmented material) pigmented materials.

The voids and surrounding void regions are gaps that may extend partly through the thickness of the microstructured layer or may extend through the full thickness of the microstructured layer to form through-holes. Where the voids or surrounding void regions are through-holes, the base areas may be formed by a layer other than the microstructured layer. In one embodiment, the side areas are coated to be contrasting to the base areas.

Where the image icon elements include posts, in one embodiment, the areas surrounding the posts are coated and/or partially or completely filled with one or more pigmented or unpigmented materials.

Image Icon Elements—Contrasting Material

In the present invention, the image icon elements (i.e., voids, posts, or a combination thereof), together with the contrasting material and the microstructured layer to which they are integrated in or on, cooperate to form the arrangement of image icon elements. In the embodiments described herein, the arrangement of image icon elements includes at least two contrasting materials such that a colorshift-effect can be achieved by changing viewing angles relative to the fixed arrangement of focusing elements. Where there are at least two contrasting materials, at least two will preferably have at least one distinguishing feature from the other where said distinguishing feature is selected from at least one of color, texture, refractive index, or material.

In the embodiments described herein, the contrasting material is incorporated into the array of image icon elements by filling or coating the voids, posts, or surrounding background regions, as described above, with a contrasting material. The contrasting materials are then directionally cured as described in further detail below. The directional curing produces cured segments of contrasting materials in the image icon elements. These segments are organized in a pattern corresponding to the org-pattern of the sacrificial arrangement of focusing elements through which they were directionally cured. Through directional curing and washing away uncured segments of the first contrasting material at least a first contrasting material pattern and a second contrasting material pattern are provided across the array of image icon elements.

In the embodiments described herein, it is contemplated that the array of image icon elements will be filled or coated with at least one contrasting material and directionally cured such that at least a first contrasting material pattern and a second contrasting material pattern are formed across the array of image icon elements. Alternatively, in a further embodiment, the array of image icon elements are filled/coated with two or more contrasting materials, directionally cured through a sacrificial arrangement of focusing elements to form at least a first and a second contrasting material pattern.

For example, in one such embodiment, the voids are filled with a first contrasting material, is directionally cured at a first cure angle and washed to form a first contrasting material pattern and an empty area (air segments) contrasting material pattern. In a further embodiment, the air segments in the image icon elements are then filled with a second contrasting material that is then directionally cured at a second cure angle and washed to provide the second contrasting material pattern and another empty area contrasting pattern. In further embodiments, additional successive contrasting materials can be added to the empty areas within the image icon elements and then directionally cured and washed to form further contrasting material patterns.

In the embodiments provided herein, it is also contemplated that one or more contrasting material patterns are formed by directionally curing those contrasting materials through a first sacrificial arrangement of focusing elements while the other contrasting materials are either (i) directionally cured through another sacrificial arrangement of focusing elements or through one or more fixed arrangements of focusing elements; or (ii) is flood cured through one or more sacrificial arrangements of focusing elements or through one or more fixed arrangements of focusing elements.

For example, in one such embodiment, the array of image icon elements are filled with a first contrasting material that is then directionally cured through the first sacrificial arrangement of focusing elements. The empty areas in the image icon elements are then filled with a second contrasting material that is then directionally cured through a second sacrificial arrangement of focusing elements. In another embodiment, the second contrasting material is then directionally cured through a first fixed arrangement of focusing elements. In yet another embodiment, the second contrasting material is flood cured through the sacrificial arrangement of focusing elements or through the fixed arrangement of focusing elements or both. It is here noted that the sequence of curing is not determinative and that curing through the sacrificial arrangement of focusing elements may precede or be preceded by curing through the fixed arrangement of focusing elements. In embodiments where the sacrificial arrangement of focusing elements and fixed arrangement of focusing elements are on opposing sides of the microstructured image icon layer, it is preferable that curing through the fixed arrangement of focusing elements precede curing through the sacrificial arrangement of focusing elements.

Suitable second, third or additional contrasting materials may be the same or different from the first contrasting material used. Where the first, second, third and additional contrasting materials are the same, they may be modified in situ to provide distinguishing features such as color, topography, or thickness, or may be modified by being subjected to different cure processes or cure rates. Where the first and additional contrasting materials are different, their differences may be reflected in terms of refractive index, material, color, topography, or thickness for example.

In one particular embodiment, different types of contrasting materials are used as the first and second contrasting materials. For example, in one embodiment, the first contrasting material is a reflective material that is solidified such that the voids have segments of reflective materials and segments of substantially empty spaces. Subsequently, a pigmented material is added to the substantially empty spaces and is then directionally cured through the sacrificial arrangement of focusing elements at a cure angle to produce a directionally cured and washed arrangement of image icon elements. Although in this embodiment the reflective contrasting material was added to the voids first, it is also contemplated within the scope of the present invention that the pigmented material is added first and is directionally cured before or after the reflective contrasting material is added to the voids.

While not intended to be restrictive, it is preferable that at least one of the contrasting material is a pigmented material. The other contrasting material will either be another filling/coating material or the empty area next to the directionally cured contrasting material segments. For example, in one embodiment, the first contrasting material comprises pigmented particles and the second contrasting material is air in an empty void area abutting directionally cured pigmented material. Applicant has surprisingly found that pigmented particles having dimensions ranging from 0.1 µm to about 1.2 µm are preferred; more preferably, about 0.5 µm to about 1.0 µm. The inventors have surprisingly found that particles that are sized above this preferred range tend to scatter the collimated light thereby deteriorating the resolution of the directionally cured array of image icon elements. In contrast, pigmented materials with particles lower than the preferred range tend to also deteriorate the resolution by absorbing too much of the collimated light and thereby forming larger segments of contrasting material in the image icon elements than desired.

The contrasting material, while preferably a pigmented material, may also be, for example, a reflective material. Suitable reflective materials include metallic materials such as tin, titanium, aluminum, gold, silver, chromium, bismuth, or combinations thereof.

Pigmented materials contemplated for use in the present invention include, but are not limited to, pigmented resins and inks. In an exemplary embodiment, a sub-micron pigment in the form of a pigment dispersion, which is available from Sun Chemical Corporation under the product designation 'Spectra Pac', is used. To this pigment dispersion is added other curable (e.g., ultraviolet (UV) curable) materials and photoinitiators so as to achieve a curable pigmented material suitable for use in the present invention. The resulting curable pigmented material is then used to prepare the posts, or to fill the voids (or recesses) and/or the regions surrounding the posts.

The contrasting material pattern, when viewed through the sacrificial arrangement of focusing elements, produces a first sacrificial synthetic image. This first sacrificial synthetic image is formed through the cooperation of the sacrificial focusing elements and the contrasting material pattern when viewed through the sacrificial arrangement of focusing elements at the cure angle. The color of the first sacrificial synthetic image corresponds to the color of the directionally cured contrasting material. However, the colors will shift as the viewing angle changes from the cure angle, thereby creating another sacrificial synthetic image of a different color or to a different image, or both. The transition from the first sacrificial synthetic image to the other sacrificial synthetic image will often involve a snap (due to the large blocks of color observable) as the sacrificial synthetic image transitions from one color to the other.

In one particular embodiment, a first pigmented material is applied to fill the voids and is then directionally cured by applying collimated light, at a cure angle and through a sacrificial arrangement of focusing elements, to the image icon elements thereby curing the pigmented material to produce a cured pattern of image icon elements in the arrangement of image icon elements. The areas of the pigmented material which are not cured, are washed away to provide image icon elements with a void, a cured contrasting material element within the void, and a washed out area within the void where the contrasting material was removed. A first sacrificial synthetic image (pigmented) is provided through the cooperation of the sacrificial arrangement of focusing elements and the arrangement of image icon elements, when the arrangement of image icon elements is viewed through the sacrificial arrangement of focusing elements at the cure angle. As the point of view is changed from the cure angle, the color of the sacrificial synthetic image will change from that of the pigmented material to another color, or to an image different from the first sacrificial synthetic image.

The directionally cured and washed arrangement of image icon elements, as described above and which includes the cured pattern of image icon elements is suitable for coupling with a fixed arrangement of focusing elements such that a fixed pattern of image icon elements, different from the pattern viewable through the sacrificial arrangement of focusing elements at the cure angle, is viewable through the fixed arrangement of focusing elements.

In one embodiment, the image icon elements include posts. These posts can be formed by the same process used for forming voids or they can be formed by printing the posts onto a microstructured layer. Alternatively, the posts can be formed by flood coating the microstructured layer with a curable material such as a resin and then directionally curing the material through the sacrificial arrangement of focusing elements to form first posts. Additional posts, having the same or different contrasting material, can also be formed by filling the void regions surrounding the first posts with additional contrasting material and further directionally curing the additional contrasting material to form additional posts. In each of these cases, the formed posts can then be coated with a contrasting material and/or the surrounding void regions are filled or coated with a contrasting material, or both the posts and the surrounding void regions are filled/coated with different contrasting materials or materials modified in situ to be optically different.

While the size, form and shape of the image icons are not limited, these posts or void icons may assume the form or shape of, for example, positive or negative symbols, letters, portraits, images and/or numerals that may be visually detected and possibly machine detected or machine read. They may also constitute bas-relief structures that give a three-dimensional effect, or composite or mosaic-like images formed by a plurality of spaced apart, raised or recessed icons that may take the form of lines, dots, swirls, or combinations thereof. In one contemplated embodiment, the image icons are raised or recessed icons having a height or recess depth ranging from about 0.5 to about 8 microns.

Embodiments are contemplated in which two or more types of image icon elements (e.g., micro- and nano-sized image icons) are in register with one another within one arrangement or layer of image icons within the inventive device. For those embodiments, a form of preferred curing is required. One form of preferred curing, contemplated by way of the present invention, is differential dissolution of the fill, which may be accomplished using structures of different size and fills of differing solubility. This may be combined with curing by collimated light to produce different structures with different compositions on a single layer. Collimated light curing may also be used alone as a means for producing such single layers of multifunctional micro- and/or nano-sized image icons.

The directionally cured microstructured layers resulting from the above embodiments are individually or collectively suitable for coupling to fixed arrangement of focusing elements.

Focusing Elements

Focusing elements as used herein refer to components of the optical security device which function to magnify and optically combine micro-images—or parts of micro-images—disposed in a microstructured layer, into one or more synthetic images. Suitable focusing elements include, without limitations, lenses of various sizes and shapes. More particularly, in certain embodiments provided herein the lenses are selected from spherical, aspherical or lenticular lenses. While parallel aligned lenticules are the preferred form of lenticular lenses, it is also contemplated herein that the lenticules are cross-hatched to form a pseudo aspherical lens at the point of intersection. For those lenses which are spherical or aspherical, different base geometries are also contemplated including those having circular base and those having from 3 to 10 sides. These include square bases, rectangular bases, or octagonal bases. The array of lenses may be organized into multiple sets where the members of each set are arranged to form a desired geometric shape. Surprisingly, it has been found that lens sets organized in a hexagonal orientation provide improved spacing and resolution allowing more information to be packed into the system. Moreover, it is also contemplated that the focusing elements are embedded or that the focusing elements in an arrangement of focusing elements (sacrificial or fixed) has phase shifts based on lens pitches, lens sizes, or lens shapes. The focusing elements cooperate with image icon elements in the microstructured layer to produce a synthetic image when the image icon elements or portions thereof are viewed through the focusing elements.

The focusing elements, whether part of the sacrificial or fixed arrangement, include, but are not limited to, refractive focusing elements, reflective focusing elements, hybrid refractive/reflective focusing elements, perforations, and combinations thereof. In one contemplated embodiment, the focusing elements are refractive microlenses. Examples of suitable focusing elements are disclosed in U.S. Pat. No. 7,333,268 to Steenblik et al., U.S. Pat. No. 7,468,842 to Steenblik et al., and U.S. Pat. No. 7,738,175 to Steenblik et al., all of which are fully incorporated by reference as if fully set forth herein.

It is also contemplated within the scope of the instant invention that the focusing elements are embedded. Embedment of the focusing elements of either the sacrificial or fixed arrangements serves to improve its resistance to optically degrading external effects. Here the focusing elements are at least partially buried beneath an interfacing material layer which preferably does not affect the refractive index of the focusing elements. However, in one embodiment, the refractive index from an outer surface of the inventive device to refracting interfaces is varied between a first and a second refractive index, the first refractive index being substantially or measurably different than the second refractive index. The phrase "substantially or measurably different", as used herein, means a difference in refractive index that causes the focal length(s) of the focusing elements to change at least about 0.1 micron. It has been surprisingly found that an increased difference between the refractive index of the lens material and the interfacing material correlates to an improved locking in of a shorter focal length range.

The embedding material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions. In one embodiment, the interfacing material embeds the lens' interstitial space and extends to the apex of the lens without covering the lens' apex. In another embodiment, the interfacing material embeds the entire lens system including interstitial space and lens apex.

In the present invention, there are sacrificial focusing elements and fixed focusing elements. The sacrificial arrangement of focusing elements is used in the directional curing of the arrangement of image icon elements. By such use of the sacrificial arrangement of focusing elements, patterns of at least first and second contrasting materials are formed in the arrangement of image icon elements. The first contrasting material pattern corresponds, at least in part, to the particular org-pattern of the sacrificial arrangement of focusing elements and cure angle. For example, in one embodiment, the pattern of the sacrificial arrangement of focusing elements is selected based on (1) the skew of the array of focusing elements relative to the array of image icon elements, or (2) the pitch of the sacrificial arrangement of focusing elements, or (3) the size of the focusing elements in the sacrificial arrangement of focusing elements, or any combination thereof. Moreover, the pattern of the sacrificial arrangement of focusing elements could in addition or alternatively be based on (4) the construction, (5) the refractive index, or (6) the reflection of the sacrificial arrangement of focusing elements. The pattern of the sacrificial arrangement of focusing elements may also be modulated by (7) masking portions of these focusing elements such that directional curing only cures areas of the arrangement of image icons that are not obscured by the mask. By selecting one or more of these org-patterns in the sacrificial arrangement of focusing elements and directionally curing the arrangement of image icon elements through this pattern, a first contrasting material pattern is formed in/on the microstructured layer, which correlates to the org-pattern in the sacrificial arrangement of focusing elements.

The fixed arrangement of focusing elements also has an org-pattern based on skew, pitch, size, construction, refractive index, reflection, or any combination thereof or as described above for the sacrificial arrangement of focusing elements. This pattern of the fixed arrangement of focusing elements is selected to be mismatched from the pattern used in the sacrificial arrangement of focusing elements such that at least one of the skew, pitch, size, shape, phase shift, construction, refractive index, or reflection is different from the pattern found in the sacrificial arrangement of focusing elements. As such, the pattern of the fixed arrangement of focusing elements will also be mismatched from the contrasting material patterns created by directionally curing the arrangement of image icon elements through the sacrificial arrangement of focusing elements. Also provided herein, as a result, is a lens-lens mismatch between sacrificial and fixed arrangements of focusing elements that is due to masking of areas of one of either arrangement of focusing elements which is different from the other. The arrangement of image icon elements, having a cured first contrasting material pattern, cooperates with the fixed arrangement of focusing elements to produce a fixed synthetic image. An observer viewing the arrangement of image icons through the fixed arrangement of focusing elements would observe a fixed pattern of image icon elements that is different from the sacrificial pattern of image icons that would be observed by the same observer, from the same point of view, when viewing the arrangement of image icons through the sacrificial arrangement of focusing elements.

In one embodiment, the optical security device is produced by providing an arrangement of image icon elements, filling the image icon elements with a pigmented material (i.e., first contrasting material), providing a sacrificial arrangement of focusing elements and directionally curing areas (cured areas) of the contrasting material, removing uncured areas of the first contrasting material to produce empty areas in the image icon elements, removing the sacrificial arrangement of focusing elements, providing a fixed arrangement of focusing elements relative to the arrangement of image icon elements such that the image icon elements cooperate with the fixed arrangement of focusing elements to produce a fixed synthetic image. A pattern mismatch between the pattern of the sacrificial arrangement of focusing elements and the pattern of the fixed arrangement of focusing elements produces synthetic images composed of both cured areas of first contrasting material and empty areas. As such, an observer who changes points of view can observe a synthetic image having one contrasting color, both, or none. For example, in some embodiments, synthetic images consisting of rolling bars of different colors are provided.

In a further embodiment, the empty areas are filled with one or more other contrasting material, different from the first contrasting material, that is then cured at least in part. Curing of the other contrasting material may be by flood curing, by masking or by directional curing. Any remaining uncured areas are then removed. Removal of the uncured areas is preferably by washing. The sacrificial arrangement of focusing elements is removed and the fixed arrangement of focusing elements is disposed relative to the arrangement of focusing elements to produce a synthetic image. A pattern mismatch between the sacrificial pattern of the sacrificial arrangement of focusing elements and the fixed pattern of the fixed arrangement of focusing elements produces synthetic images composed of both the first contrasting material and the other contrasting material. As such an observer from at least one point of view sees a synthetic image composed of both the first contrasting material patterns (composite pattern) and the other contrasting material. More preferably, the synthetic image, when viewed from all angles, will be a projection based on a composite pattern. This allows a smooth transition from a synthetic image composed of the first contrasting material to a synthetic image composed of the other contrasting material. For example, in one embodiment where the first contrasting material is a red pigmented material and the second contrasting material is a blue pigmented material, at a first viewing angle a red synthetic image, such as rolling bars, or flickering images, is observed, while at a second viewing angle a blue synthetic image is observed with red portions, and at a third viewing angle, a red and blue synthetic image is observed. Transitions between red synthetic images and blue synthetic images are smoother and without snap effects.

The arrangement of focusing elements, whether sacrificial or fixed, has a skew angle—along which a pattern of focusing elements repeat—when the pattern being relied on is based on skew. Likewise, the arrangement of image icon elements also has a skew angle along which a pattern of image icon elements have a repeat pattern. Where these skew angles are oriented or misaligned various optical effects are observed in the synthetic images produced through the cooperation of the image icons and the focusing elements. For example, when a focusing element arrangement is slightly rotated off of where it should be in relation to an image icon arrangement (i.e., on the order of 1 degree or less ($\leq 1$)), it typically changes the synthetic images to become smaller and closer together and will produce synthetic image effects such as Float, SuperFloat, Deep, SuperDeep, Levitate, Morph, 3-D effects, as described in U.S. Pat. No. 7,333,268. An axis of symmetry is defined herein as a line that the arrangement could be reflected around, rotated around, or both, without changing the geometry of the arrangement. While not required, in certain embodiments, the axis of symmetry coincides with the skew angle.

By directionally curing the contrasting material, color blocks observed through the fixed arrangement of focusing elements are smaller than those observed through the sacrificial arrangement of focusing elements, with the size dependent on the skew (i.e., angle of rotation) of the fixed arrangement of focusing elements from the skew of the sacrificial arrangement of focusing elements. The size will change rapidly as the angle is changed off from the cure angle.

Directional Curing

The inventors of the instant invention have surprisingly found that by directionally curing the arrangement of image icon elements to form a directionally cured microstructured layer (i.e., directionally cured arrangement of image icon elements), that multiple contrasting materials can be incorporated into the arrangement of image icon elements thereby providing synthetic images comprised of multiple contrasting materials. When the arrangement of image icon elements is viewed through a sacrificial arrangement of focusing elements at the cure angle, a sacrificial pattern of image icons (including two contrasting material patterns) in the arrangement of image icon elements cooperates with the sacrificial arrangement of focusing elements to produce a sacrificial synthetic image that changes color. However, when the arrangement of image icon elements is viewed through a fixed arrangement of focusing elements, a fixed pattern of image icon elements is observed and cooperates with the fixed arrangement of focusing elements to produce a fixed synthetic image that changes color more smoothly; without the "snap" effect associated with directionally curing the image icon elements through the fixed arrangement of focusing elements.

Directional curing, as used herein, refers to the process of directing a curing force towards a contrasting material integrated in an arrangement of image icon elements by directing the curing source through a sacrificial arrangement of focusing elements at a cure angle. By directing the curing force at a desired cure angle, segments of the contrasting material in each of the image icon elements remain uncured and can then be washed away to leave an empty area filled with air as the second contrasting material. That is to say that the light is directed at an angle through the sacrificial arrangement of focusing elements such that it impinges on the targeted areas of the arrangement of image icon elements. Viewing the image icon elements through the sacrificial arrangement of focusing elements, from a point of view along the cure angle, allows the observer to see the pattern of directionally cured image icon elements. Moving away from the cure angle changes the patterns of image icon elements that are viewable through the sacrificial arrangement of focusing elements. In fact, the contrasting material in the empty areas can project a synthetic image when viewed at the appropriate angle through the focusing elements. As mentioned herein, additional contrasting materials may be integrated into the empty spaces of the image icons to be cured to form a separate pattern contrasting material pattern. For example, in one embodiment, a first pigmented material is applied to the voids, directionally cured and washed and then an additional pigmented material is added to the empty areas of the voids, directionally cure at a different cure angle through the sacrificial arrangement of focusing elements and optionally washed to remove any uncured pigmented material.

In a preferred embodiment, directional curing comprises applying radiation, such as collimated light, through the sacrificial arrangement of focusing elements at a first cure angle such that the light impinges on segments of the first contrasting material present in the image icon elements thereby solidifying the segments of the first contrasting material. Areas of the first contrasting material that are not solidified are then washed out to leave cured segments of contrasting materials and segments of a substantially empty space filled with air which functions as a second contrasting material. The cured first contrasting material and the empty space can function to provide first and second colors, respectively, for the color transition effects. Moreover, the empty space may be filled or coated with a material distinguishable from the first contrasting material. It is also contemplated within the scope of the present invention that multiple additional contrasting materials are similarly added and directionally cured.

In one embodiment, the directional curing of the arrangement of image icon elements involves directing collimated light from a collimated light source through the sacrificial arrangement of focusing elements toward the icon array such that the resulting light impinges on the pigmented material integrated in/on the microstructured layer thereby curing at least portions of the pigmented material(s). Suitable collimated light sources include laser light, light (e.g., sunlight, UV light, infrared (IR) light) directed through one or more collimating lenses, through a narrow slit, toward a parabolic reflector, from a more directional source such as an array of LEDs, or combinations thereof. In one contemplated embodiment, the collimated light source is a UV lithography exposure unit.

As previously mentioned, the image icon elements can be formed from two or more contrasting materials. Pigmented materials such as inks which can have a contrast against air are most suitable. These may be prepared by curing each material with collimated light, or by curing one material with collimated light and another material with another means for curing (e.g., radiation curing, chemical reaction). Synthetic images of the image icons formed from such directionally cured pigmented material(s) would be viewable at the cure angle(s), while synthetic images of the image icons formed from the non-directionally cured pigmented materials would be viewable over a wide range of angles. It is noted that the arrangement(s) of image icon elements used in the practice of the present invention may also include prior art image icon elements formed in their entirety from non-directionally cured pigmented materials.

Various pigmented materials suitable for use in the instant invention will be apparent to a PHOSITA. In one embodiment, each image icon in the arrangement(s) of image icons is formed from one cured fluorescent pigmented material and from one cured non-fluorescent pigmented material. Here, the fluorescent feature, which is detectable only at a given angle but not at another given angle, may serve as an effective machine readable authenticating feature.

As noted herein, directional curing includes directing a radiation source, capable of curing a targeted material, through a sacrificial arrangement of focusing elements. The sacrificial arrangement of focusing elements is then removed by either separating it from the optical security system or by integrating it into the optical security system. In one embodiment, the directional curing involves a dynamic system where the sacrificial arrangement of focusing elements is not held in static relation to the arrangement of image icon elements, but is rather brought into dynamic contact with the arrangement of image icon elements. As the sacrificial arrangement of focusing elements is brought into contact with the arrangement of image icon elements, a radiation source directs curing radiation towards the image icon elements (e.g., voids filled with—or posts comprising—contrasting material(s)).

In one particular embodiment, the sacrificial arrangement of focusing elements is dynamically applied to the arrangement of image icon elements and cured while these arrangements traverse each other. The sacrificial arrangement of focusing elements has an org-pattern mismatch with the org-pattern of the fixed arrangement of focusing elements that will be in the optical security device. This sacrificial arrangement is affixed to a first conveyor while the arrangement of image icon elements is affixed to a second conveyor. The first and second conveyors are brought into substantial contact with each other such that the focal point of at least some of the focusing elements is situated at the image icon elements. A curing radiation source (e.g., collimated light), which can now be held steady while the conveyors move, applies a curing radiation across the sacrificial arrangement of focusing elements at a desired cure angle. As the conveyors traverse each other, the image icon elements are directionally cured. The inventors have found that by this process, the directional curing step can be more precisely controlled since the radiation source does not move. Moreover, the same focusing elements may be repeatedly used to form the one or more cured pattern of image icon elements.

From the embodiments described herein, a further embodiment comprises a microstructured layer having multiple contrasting material patterns cured through directional curing. At least one of the multiple contrasting material patterns includes a first cured pattern that is directionally cured through the sacrificial arrangement of focusing elements. In another embodiment, at least one of the contrasting material patterns include a first cured pattern that is directionally cured through a first sacrificial arrangement of focusing elements and a second cured pattern that is directionally cured through a second sacrificial arrangement of focusing element. It has been surprisingly found that by using separate sacrificial arrangements of focusing elements, to cure each contrasting material multiple color-transition effects can be achieved such as having one color rolling in an orthoparallactic direction while the other rolls in the direction of tilt when the security device is tilted. In another embodiment, at least one of the contrasting material patterns includes a first cured pattern that is directionally cured through a first sacrificial arrangement of focusing elements and a second contrasting material pattern that is directionally cured through at least one fixed arrangement of focusing elements. In another embodiment, at least one of the cured patterns includes a first cured pattern that is directionally cured through a first sacrificial arrangement of focusing elements and a second pattern provided by a portion of the void that is coated or partially filled with a metallic, or reflective material.

Removal of Sacrificial Arrangement of Focusing Elements

Removal of the sacrificial arrangement of focusing element as referred to herein includes both (i) separating or detaching the sacrificial arrangement of focusing element from the rest of the intermediate optical security device construct or from the arrangement of image icon elements and (ii) also to integration of the sacrificial arrangement into the security device such that these focusing elements no longer function as focusing elements. Separating the sacrificial arrangement of focusing element can be by delamination, ablation or by other peeling away of the focusing elements from the arrangement of image icon elements. Integrating the sacrificial arrangement of focusing elements can be by applying some radiation (e.g., heat) which removes the structural relief of the focusing elements thereby creating a surface that is relatively flat compared to the originally present sacrificial arrangement of focusing elements. Alternatively, the sacrificial arrangement of focusing elements can be integrated into the system by covering it with another sacrificial arrangement of focusing elements, or one or more fixed arrangements of focusing elements.

As noted above, removal of the sacrificial arrangement of focusing elements may also be through the use of a sacrificial arrangement of focusing elements and an arrangement of image icon elements where at least one of these arrangements is dynamically disposed relative to the other.

In one embodiment, the optical security device is as described throughout the various embodiments herein regarding providing the arrangement of image icon elements, the sacrificial arrangement of focusing elements and directionally curing the image icon elements. Additionally, in this embodiment, the sacrificial arrangement of focusing elements is left disposed over the arrangement of image icon elements. The fixed arrangement of focusing elements is disposed over the sacrificial arrangement of focusing elements, either directly or indirectly, such that the sacrificial arrangement of focusing elements is integrated and functions as an optical spacer between the fixed arrangement of focusing elements and the arrangement of image icon elements. An interface is thereby provided, preferably directly, between the two arrangements of focusing elements.

The present invention further provides a method for producing an exemplary embodiment of the above-described optical device with an optical spacer, wherein the permanent or fixed arrangement(s) of focusing elements has a skew angle or in the alternative, an axis of symmetry and is positioned to form one or more synthetic images of at least a portion of the image icons, the position of the fixed arrangement(s) of focusing elements constituting an intended position of this arrangement in the optical device, wherein the method comprises:

(a) forming a sacrificial arrangement of focusing elements on a side of a film, wherein the sacrificial arrangement of focusing elements (i) has skew angle that is rotated at a slight angle ($\alpha$) of 1 degree or less ($\leq 1°$) from the intended position of the skew angle of the permanent or fixed arrangement(s) of focusing elements, (ii) has an org-pattern that is distinct from the permanent or fixed focusing element arrangement(s) in terms of size, pitch, or construction, and/or (iii) has one or more masked areas;

(b) forming the arrangement(s) of image icons on or within an opposing surface of the first film, wherein the image icons are (i) in the form of posts formed from one or more pigmented materials, (ii) in the form of posts where areas surrounding the posts are coated and/or partially or completely filled with one or more pigmented materials, or (iii) in the form of voids or recesses which are coated and/or partially or completely filled with one or more pigmented materials;

(c) directing collimated light from a collimated light source at a defined cure angle through the sacrificial arrangement of focusing elements toward the arrangement(s) of image icons such that the light impinging on the arrangement(s) causes curing of the one or more pigmented materials;

(d) optionally adding one or more different pigmented materials to the arrangement(s) of image icons and repeating step (c) for each different pigmented material using collimated light at a different cure angle, or non-collimated light to cure the pigmented material;

(e) forming the permanent or fixed arrangement(s) of focusing elements either on (i) an upper surface of a second film, the second film constituting an optical spacer, and then transferring the at least one arrangement of cured image icons from the first film to a lower surface of the second film, or on (ii) an upper surface of the sacrificial arrangement of focusing elements, wherein the sacrificial arrangement of focusing elements becomes part of the first film, the first film constituting an optical spacer.

Integration of the sacrificial arrangement of focusing elements into the optical security device allows the sacrificial arrangement to function as spacer layer (e.g., an optical spacer). Alternatively, it is also contemplated that where the sacrificial arrangement of focusing elements is separated/detached from the rest of the system, that a separate spacer layer may be disposed between the arrangement of image icon elements and the fixed arrangement of focusing elements. Accordingly, a spacer as referenced herein may be a separate spacer or a sacrificial arrangement of focusing elements. For instance, the fixed arrangement of focusing element may be formed on a first side of a second film layer. The arrangement of image icon elements are then separated from the bilayer system of sacrificial arrangement of focusing elements and a first film and disposed on the second side of the second film, where the second film functions as a spacer layer.

The spacer layer may be formed using one or more essentially transparent or translucent polymers including, but not limited to, polycarbonate, polyester, polyethylene, polyethylene naphthalate, polyethylene terephthalate, polypropylene, polyvinylidene chloride, and the like. In an exemplary embodiment, the optical spacer or spacer layer is formed using polyester or polyethylene terephthalate.

It is noted that while the use of an optical spacer or spacer layer is mentioned in certain exemplary embodiments herein, the optical security device and the intermediate products of the present invention may also be prepared without an optical spacer or spacer layer. For example in one embodiment the sacrificial arrangement of focusing elements touch or is substantially in contact with the arrangement of image icon elements. In such embodiments, the image icon elements are in contact with, the sacrificial arrangement of focusing elements while still remaining at the focal point of the focusing elements. In one particular embodiment, the image icon elements are partly, but not completely, embedded in the sacrificial arrangement of focusing elements. Similarly, in a further embodiment, the fixed arrangement of focusing elements is disposed relative to the arrangement of image icon elements without a spacer.

The microstructured layer and the fixed arrangement of focusing elements, and the sacrificial arrangement of focusing elements may be of the same or different materials. In either case, radiation curable resins are contemplated for use in forming these components of the optical security device and its intermediates. For example, suitable radiation curable resins include, but are not limited to, acrylics, epoxies, polyesters, acrylated polyesters, polypropylenes, urethanes, acrylated urethanes, and the like. Preferably, the arrays are formed using an acrylated urethane, which is available from Lord Chemicals.

One aspect of the present invention is a product-by-process where the invention includes the optical security device produced from the method steps described in the various embodiments herein, including that of the previous paragraph.

In one embodiment, the optical security device is as described throughout the various embodiments herein regarding providing the arrangement of image icon elements, the sacrificial arrangement of focusing elements and directionally curing the image icon elements. Additionally, in this embodiment, the sacrificial arrangement of focusing elements is peeled away from the arrangement of image icon elements. The fixed arrangement of focusing elements is then disposed over the arrangement of image icon elements to produce a synthetic image as described throughout herein. It is contemplated herein that a spacerless optical security device is produced by detaching the sacrificial arrangement of focusing elements from the arrangement of image icon elements and then disposing the arrangement of image icon elements beneath a fixed arrangement of focusing elements. However, the present invention also provides an embodiment where a further layer is disposed beneath the fixed arrangement of focusing elements, such as where the focusing elements are formed on a film layer, and the film layer along with the fixed arrangement of focusing elements are disposed over the arrangement of image icon elements. Under such circumstances, the film layer functions as a spacer layer, or more specifically an optical spacer layer.

Curing of the contrasting material or any portion of the image icon elements is preferably done through the sacrificial arrangement of focusing elements. However, the inventors have surprisingly found that it is also possible to cure portions of the image icon elements directly or through the sacrificial arrangement of focusing elements and other portions through the fixed arrangement of focusing elements. For example, where one contrasting material is cured through the sacrificial arrangement of focusing elements, a second contrasting material can be cured through the fixed arrangement of focusing elements or can be cured directly (i.e., directing the curing force directly to the contrasting material without going through the fixed or sacrificial arrangements of focusing elements. Curing through the fixed arrangement guarantees that the synthetic image will be comprised of a single contrasting material when viewed through the focusing elements from at least the cure angle. Accordingly, the synthetic image may be provided such that at a selected view point angle, the synthetic image has a red pigment, while at all others it has a pigment of both blue (first contrasting material) and red (second contrasting material).

It is also contemplated herein that the focusing elements are of various types, sizes and shapes. For example, the arrangement of focusing elements, whether fixed or sacrificial, can be spherical, aspherical.

Synthetic Images

As noted above, the optical device of the present invention comprises at least one arrangement of image icons formed from one or more cured pigmented materials, and at least one arrangement of optionally embedded focusing elements positioned to form one or more synthetic images of at least a portion of the image icons. Some or all of the pigmented material(s) is cured using collimated light directed through a sacrificial focusing element arrangement at one or more angles relative to a surface of the device (i.e., the cure angle(s)) to form directionally cured image icons thereby creating an intermediate optical security device). While a synthetic image(s) would be projected by the intermediate optical security device, once a fixed arrangement of focusing elements has been added to the intermediate optical security device, a synthetic image(s) is observable by viewing the directionally cured image icons elements through the fixed arrangement of focusing elements at the cure angle(s). This synthetic image, relative to those of conventional systems, more rapidly visually appears and disappears, or turns on and off, as the viewing angle of the device roves through the cure angle(s) and off the cure angle(s), respectively.

The synthetic image(s), when viewed at the cure angle(s), whether in reflective or transmitted light, may demonstrate one or more of the following optical effects:
  i. show orthoparallactic movement;
  ii. appear to rest on a spatial plane deeper than the thickness of the optical device;
  iii. appear to rest on a spatial plane above a surface of the optical device;
  iv. oscillate between a spatial plane deeper than the thickness of the optical device and a spatial plane above a surface of the optical device as the device is azimuthally rotated;
  v. exhibit complex three dimensional structures, patterns, movements, or animations; and/or
  vi. have in-plane images that appear and disappear, stay static but have dynamic bands of color moving throughout, or are animated with dynamic bands of color moving throughout.

As described in PCT/US2004/039315 to Steenblik et al., the magnitude of the magnification or synthetic magnification of the images as well as the above-noted visual effects are dependent upon the degree of "skew" between the arrangements of focusing elements (e.g., lenses) and arrangement of image icons elements, the relative scales of these two arrays, and the f-number of the focusing elements, with the f-number being defined as the quotient obtained by dividing the focal length of the lens (f) by the effective maximum diameter of the lens (D).

As also described in PCT/US2004/039315 to Steenblik et al., orthoparallactic effects result from a "scale ratio" (i.e., the ratio of the repeat period of the image icons to the repeat period of the focusing elements) substantially equal to 1.0000, when the skew angles of the arrangement of focusing elements and arrangement of image icon elements are misaligned (i.e, the skew angles are not the same). The appearance of resting on a spatial plane deeper than the thickness of the inventive optical device results from a "scale ratio" of less than 1.0000, when the skew angle of the arrangement of focusing elements and arrangement of image icon elements are substantially aligned, while the appearance of resting on a spatial plane above a surface of the inventive device results from a "scale ratio" of greater than 1.0000, when the skew angle of the arrangement of focusing elements and arrangement of image icon elements are substantially aligned. The appearance of oscillating between a spatial plane deeper than the thickness of the optical device and a spatial plane above a surface of the optical device as the device is azimuthally rotated results from axially asymmetric values of the scale ratio (e.g., 0.995 in the X direction, and 1.005 in the Y direction).

The optical device of the present invention, in an exemplary embodiment in which the focusing elements are microlenses and each image icon in the arrangement(s) of image icon elements is formed from one cured pigmented material, may be prepared by: (a) applying a substantially transparent or clear radiation curable resin to upper and lower surfaces of a first optical spacer or spacer layer: (b) forming a sacrificial microlens array on the upper surface and an icon array in the form of voids (or recesses) and/or posts on the lower surface of the optical spacer; (c) curing the substantially transparent or clear resin using a source of radiation; (d) filling the icon array recesses and/or areas surrounding the posts with one or more pigmented materials; (e) removing excess pigmented material(s) from the lower surface of the optical spacer; (f) curing some or all of the pigmented material(s) using collimated (made parallel) light directed through the sacrificial focusing element array toward the icon layer at one or more angles relative to a surface of the optical device; and (g) applying a substantially transparent or clear radiation curable resin to either: (1) an upper surface of a second optical spacer or spacer layer, forming a permanent or fixed microlens array on the upper surface in a position relative to the intended position of the cured image icon array necessary to achieve the desired optical effect, and transferring the cured image icon layer from the first optical spacer or spacer layer to a lower surface of the second optical spacer or spacer layer; or (2) an upper surface of the sacrificial microlens array, forming a permanent or fixed microlens array on the upper surface in a position relative to the position of the cured image icon array necessary to achieve the desired optical effect, whereby the sacrificial microlens array becomes part of the first optical spacer or spacer layer.

Certain claims of this application defines a method of forming an optical security device. This method comprises at least, the following steps. These steps may be provided or executed in any particular order. However, in a preferred embodiment the steps are executed in the following order as it has been surprisingly found that the following sequence provides improved manufacturability of the optical security device. In this embodiment, the method comprises:

Providing a first sacrificial arrangement of focusing elements that is disposed over an arrangement of image icon elements. In view of the instant disclosure, it is to be understood that it is within the scope of the present invention to provide additional sacrificial arrangements of focusing elements or additional arrangements of image icon elements. The first sacrificial arrangement of focusing elements, having a sacrificial org-pattern, is used in the formation of the first- and the second-contrasting material patterns. The method therefore also comprises forming a first contrasting material pattern and a second contrasting material pattern. These two patterns are formed on or in the arrangement of image icon elements. To form the first and second contrasting material patterns, in this embodiment, the image icon elements are voids formed in a microstructured layer. These voids, without the first contrasting material, are empty (filled with air). To form the first and second contrasting material patterns, the image icon elements are filled with the first contrasting material. This first contrasting material is then cured by directing collimated light, at a selected cure angle, through the first sacrificial arrangement of focusing elements such that the collimated light impinges on the first contrasting material in the image icon elements. Due to the org-pattern of the sacrificial arrangement of focusing elements and the angle at which the collimated light is directed towards the first contrasting material, only portions of the first contrasting material within the image icon elements will be cured, thereby producing a cured pattern of contrasting material that correlates to the org-pattern of the sacrificial arrangement of focusing elements. At this stage, an intermediate security device with cured and uncured contrasting materials has been formed and is available for use in forming the optical security device.

This cured/uncured intermediate security device is then exposed to a washing process, where the arrangement of image icon elements are exposed to a washing agent which removes the portions of the first contrasting material that was not impinged by the collimated light (i.e., the uncured first contrasting material). As a consequence of this washing process, portions of the image icon elements will be filled with segments of cured first contrasting material and segments of air. The segments of cured first contrasting material will form the first pattern of contrasting material over the arrangement of image icon elements. The segments of air will form the second pattern of contrasting material over the arrangement of image icon elements. At this stage, an intermediate security device with two patterns of contrasting materials (i.e., a two-pattern intermediate security device) has been formed and is available for use in forming the optical security device. Viewing the image icon elements of this two-pattern intermediate security device through the sacrificial arrangement of focusing elements and at the cure angle, one would observe the segments of the cured first contrasting material or a synthetic image projected from the segments of cured first contrasting material. At other viewing angles, one would observe segments of the second contrasting material or a synthetic image projected from the segments of the second contrasting material. This synthetic image is referred to herein as the sacrificial synthetic image.

A further step of the process comprises disposing a fixed arrangement of focusing elements over the arrangement of image icon elements in the two-pattern intermediate security device such that the image icon elements project a synthetic image when viewed through the fixed arrangement of focusing elements. This synthetic image is referred to therein as the fixed synthetic image to identify it as an image formed through the cooperation of the fixed arrangement of focusing elements and the arrangement of image icon elements found in the two-pattern intermediate security device. As such, the fixed synthetic image should not be interpreted in a limiting manner as reflecting an image that cannot move or appear to move. In fact, in preferred embodiments, this fixed synthetic image appears dynamic as it is viewed from varying points of view.

The fixed arrangement of focusing elements, having a fixed org-pattern that is different from the sacrificial org-pattern, forms a lens-icon mismatch between the fixed arrangement of focusing elements and the arrangement of image icon elements. In other words, the fixed arrangement of focusing elements are disposed relative to the arrangement of image icons such that the fixed arrangement of focusing elements has a first fixed org-pattern that forms a lens-icon pattern mismatch between the first fixed lens pattern and the patterns of the first and second contrasting materials. The first sacrificial arrangement of focusing elements on the other hand has a sacrificial org-pattern that is matched with the first contrasting material pattern, at least at the cure angle. As such, viewing the image icon elements through the fixed arrangement of focusing elements, at any angle, one would observe portions of at least two patterns of contrasting materials; here the first and second. Moreover, because of this mismatch, a resulting fixed synthetic image projected through the cooperation of the fixed arrangement of focusing elements and the arrangement of image icon elements will include projections from at least two patterns of contrasting material; here the first and second. Projections from two or more patterns of contrasting materials shall be referred to herein as composite patterns of contrasting materials. In a preferred embodiment, projection of the composite pattern of contrasting materials is observable at all angles, including the cure angle. Nonetheless, in view of the instant disclosure it should be understood that the projected synthetic image will be formed from a composite pattern of contrasting materials when viewed through the fixed arrangement of focusing elements from at least one angle.

The fixed synthetic image, being projected from a composite pattern of contrasting materials when viewed from one or more or all angles, produces a color-transition effect which corresponds to a shift in viewing angle. As the viewing angle changes, the fixed synthetic image color changes as the composite pattern changes or move back and forth.

In one embodiment, the first contrasting material is pigmented and the second contrasting material is air. The composite pattern of pigmented contrasting material and air produces a fixed synthetic image having areas of pigment and areas or air. In another embodiment, the second contrasting material is also a pigmented material that after the first contrasting material is filled into the empty space of the washed out first contrasting material and is then cured and washed like the first contrasting material. Here both the first contrasting material pattern and the second contrasting material pattern are pigmented; preferably having different pigments. The resulting fixed synthetic image is formed from a composite pattern of multiple pigmented contrasting material patterns. As the viewing angle changes, the color pattern of the synthetic image also changes or switches back and forth. In one embodiment, the synthetic image comprises bars of different colors that roll from the first pigment to the second pigment in a pattern that displays both pigments at all angles.

The invention shall now be further described by reference to certain specific yet non-limiting embodiments.

EXAMPLES

Figure 2:
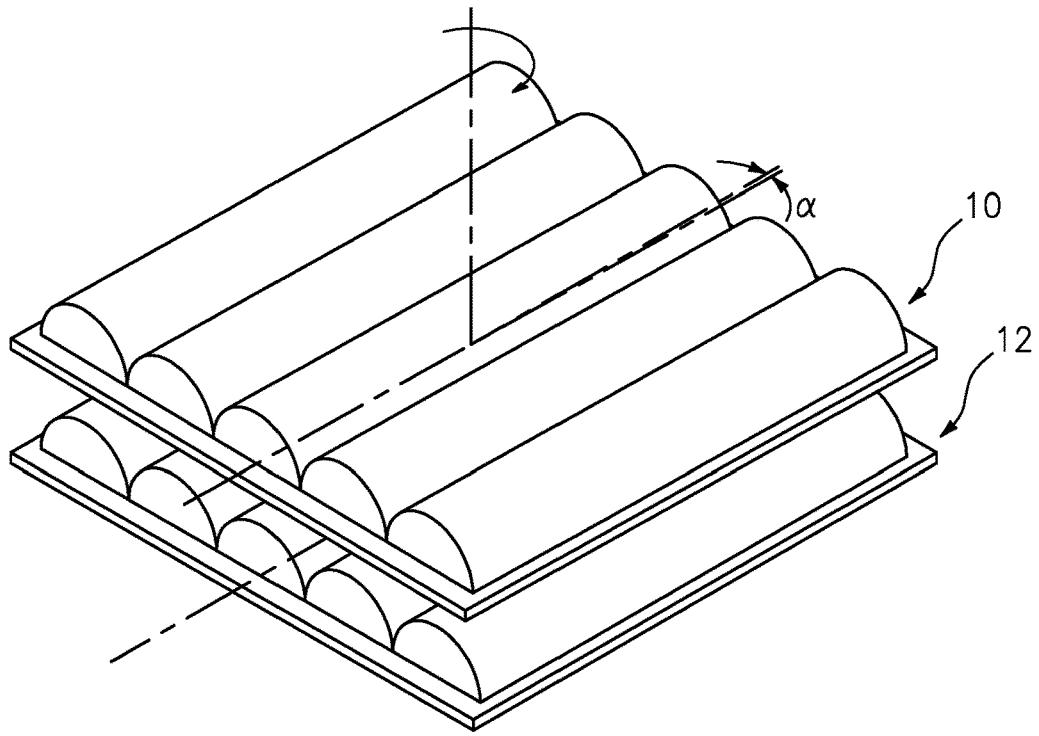
FIG. 2 is a top planar side view of a sacrificial arrangement of focusing elements (cylindrical lens arrangement) shown rotated by a slight angle ($\alpha$) of 1 degree or less from a final or permanent arrangement of focusing elements (cylindrical lens arrangement)

Referring now to the drawings detailed in FIGS. 1-2, it is there shown a blown-up section of an optical security device where a sacrificial arrangement of focusing elements 12 is disposed beneath a fixed arrangement of focusing elements 10. While the focusing elements of FIG. 1 are displayed as spherical or aspherical lenses, the focusing elements of FIG. 2 are displayed as lenticular lenses. In each case of FIG. 1 and FIG. 2, the sacrificial arrangement of focusing elements 12 and the fixed arrangement of focusing elements 10 are mismatched by misalignment of their respective skew angle. Particularly, in this specific embodiment, the mismatch is provided by rotating the fixed arrangement's skew angle an angle ($\alpha$) of 1 degree or less from the sacrificial arrangement's skew angle. Throughout all of the embodiments described herein and covered by the claims, including this instant embodiment, the sacrificial arrangement is used in producing at least one cured pattern of image icon elements (e.g., sacrificial pattern of image icon elements). In the instant embodiment, the sacrificial arrangement is used to generate at least one sacrificial pattern of image icon elements by directional curing. As previously noted, when a focusing element arrangement is slightly rotated off of where it should be in relation to an image icon arrangement, it typically (though not always) changes the synthetic images to become smaller and closer together. Here, the mismatch represented by ($\alpha$) defines the slight rotation off of where it should be in relation to the sacrificial arrangement and any sacrificial pattern of image icon elements. Where the image icon elements in the sacrificial pattern of image icon elements include contrasting materials (i.e., pigmented material segments and air segments, multiple pigmented materials, etc.), the interaction of the fixed arrangement with a sacrificial pattern of image icon elements serves to make the color "blocks" smaller than the color blocks that would have been observable through the sacrificial arrangement. The size of the color blocks depends on the size of the angle of rotation ($\alpha$) of the sacrificial and fixed arrangements from each other. Faster or smoother switching of the color results, which is much more exciting and appealing.

Figure 3:
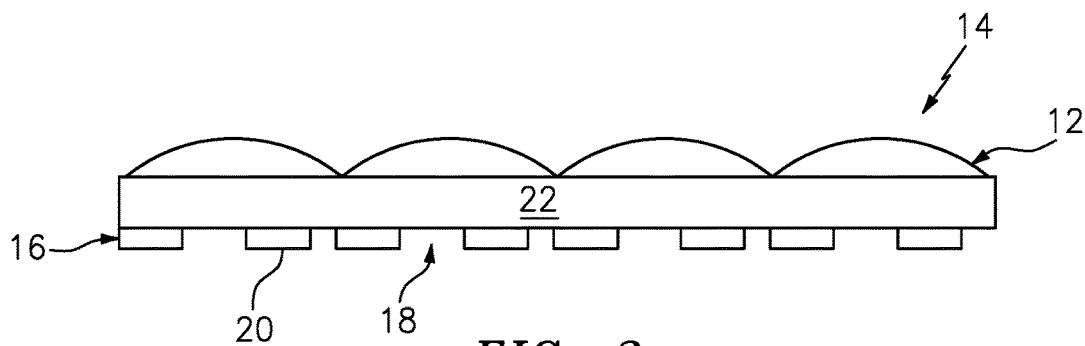
FIGS. 3-9 depict a method for forming the arrangement of image icon elements or microstructured layer of one exemplary embodiment of the intermediate optical device of the present invention.

FIGS. 3-9 depict an embodiment of the method for forming a first intermediate security device to be used for forming an optical security device. In FIG. 3, a cross-sectional side view of the first intermediate security device is provided before a permanent or fixed focusing element arrangement has been added and before any pigmented material has been incorporated into the image icon elements is shown generally at 14. First intermediate security device 14 basically comprises:

(a) a sacrificial arrangement of focusing elements 12;

(b) a microstructured layer 16 having image icon elements (voids 18 bounded by surrounding solid regions 20) (in alternative embodiments, solid regions 20 constitute posts or mesas bounded by surrounding void regions 18); and (c) a first film or optical spacer 22 onto one side of which the sacrificial arrangement of focusing elements 12 is disposed while on an opposing side the microstructured layer 16 is disposed.

The layer 16 of image icon elements (18, 20) comprises a transparent, translucent or clear layer of substantially transparent, translucent or clear radiation curable resin. In one contemplated embodiment, this microstructured layer is either prepared using a formulation that allows for easy removal from the first film 22 in a subsequent process step, or is applied onto a primer layer located on the first film 22.

It is contemplated that in further embodiments, the embodiments described herein further require that a spacer layer, such as first film 22 is provided and that radiation curable material layers are disposed on opposing sides. A lens mold is applied to the material on one side to form lenses that are then cured to form the arrangement of focusing elements, while an icon mold is applied to the opposing side to form microstructures (i.e., voids, posts or combinations thereof) in the material on the other side. The molded material layer is then cured to form the microstructured layer.

Figure 4:
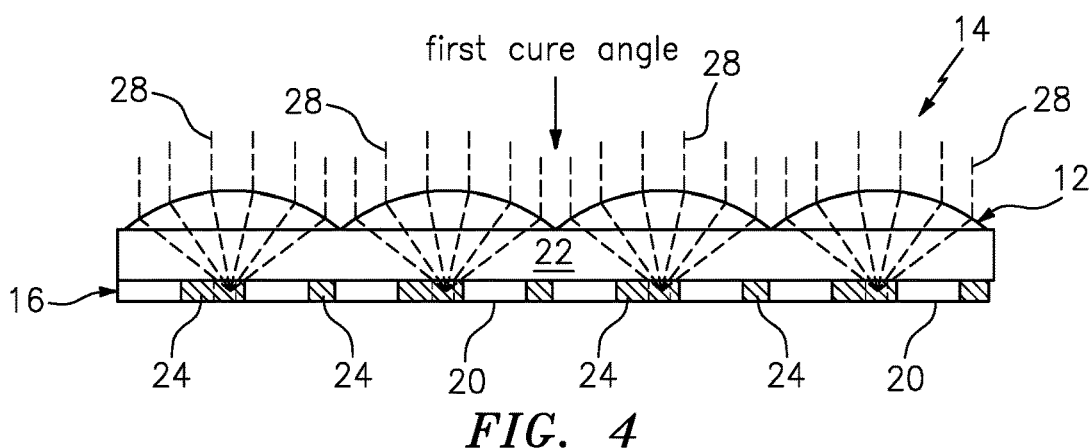

FIG. 4 depicts a cross-sectional side view of a second intermediate security device resulting from further steps in the method of producing the intermediate optical security device and ultimately the optical security device. As such, the embodiment of FIG. 4 results from filling the voids 18 of FIG. 3 with a contrasting material 24 (e.g., a first pigmented material). The contrasting material 24 is then directionally cured at a normal angle (first cure angle) through the sacrificial arrangement of focusing elements 12. Directional curing is depicted by the application of directing incident light 28 at a normal angle through the sacrificial arrangement of focusing elements 12 such that incident light rays 28 impinges upon the targeted segments of contrasting material 24 disposed within the voids 18. Each focusing element focuses its respective incident light onto the image icon elements such that portions of the contrasting material 24 in the voids 18 that are near the focusing elements focal points are cured.

Figure 5:
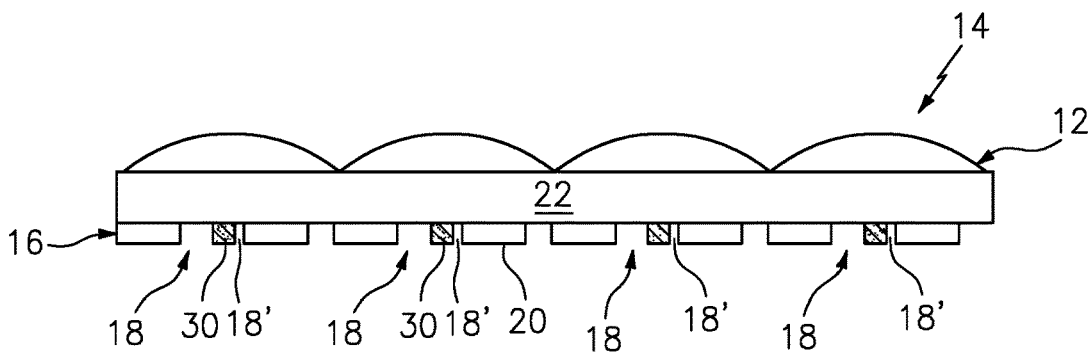

Areas of the contrasting material 24 which remain uncured (i.e., empty areas) are then removed (e.g., washed away) leaving another intermediate optical security device. This other intermediate optical security device is best shown in FIG. 5 where this intermediate optical security device comprises a first film 22 with a sacrificial arrangement of focusing elements 12 disposed on one side and the microstructured layer 16 on an opposing side. The layer 16 of image icon elements 18 have been directionally cured to produce a first cured pattern of contrasting material segments 30 in the image icon elements, such that viewing through the sacrificial arrangement of focusing elements 12 one will observe a sacrificial pattern of image icon elements, when viewed from at least the first cure angle. The image icon elements now comprise voids 18, the first cured pattern of image icon elements 30 within the voids 18 and empty spaces (i.e., recreated voids) 18' within the voids 18 from where uncured contrasting material has been removed.

Figure 6:
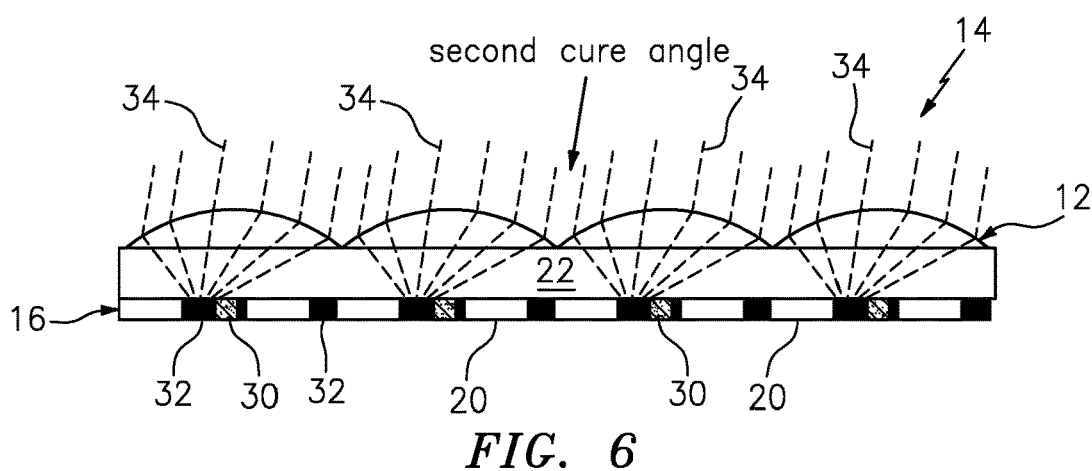

Further method steps produce a further intermediate product as depicted in FIG. 6. This intermediate product results from steps of filling at least some of the empty spaces in the voids with another contrasting material 32 that is preferably a pigmented material that is distinct from the first pigmented material. All, or portions of the another contrasting material 32, is directionally cured at a second cure angle 34 different from the first cure angle 28. Here the contrasting material 32 is directionally cured by directing collimated light at the second cure angle 34 through the sacrificial arrangement of focusing elements 12 to form a second cured pattern such that one who views the microstructured layer 16 through the sacrificial arrangement of focusing elements 12 at the second cure angle 34 will observe the second pigmented material 32 (the second cured pattern). It is to be understood that both the directional curing steps in FIG. 4 and FIG. 6 can be by collimated light. Viewing the microstructured layer 16 through the sacrificial arrangement of focusing elements 12 produces sacrificial synthetic image(s) (not shown) formed from the first pigmented material 30 (the first cured pattern) when viewed at the first cure angle (normal) 28 and formed from the second pigmented material 32 (the second cured pattern) when viewed from the second cure angle 34.

Figure 7:
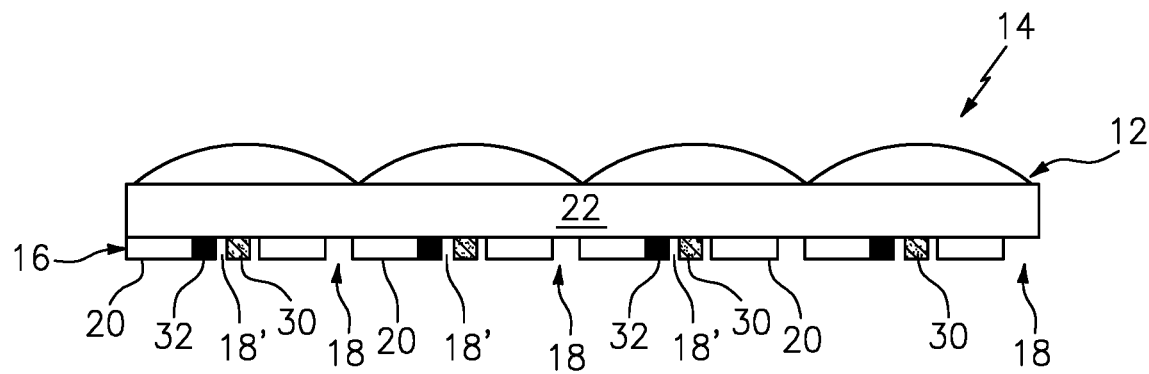
Figure 8:
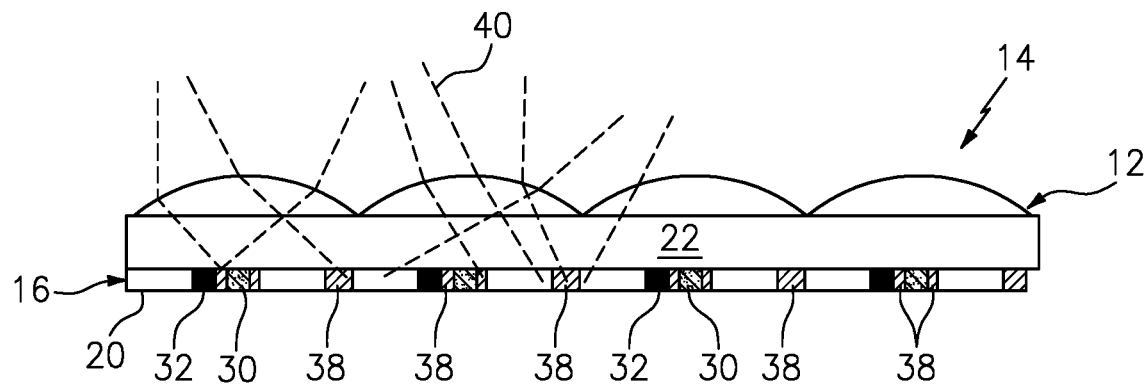

In a further embodiment, any uncured pigmented material remaining after the second directional curing step is removed. This is best illustrated in FIG. 7 where a further intermediate product is illustrated in cross-sectional side view. This intermediate product comprises a first film 22, a sacrificial arrangement of focusing elements 12 disposed on one side of the first film 22 and microstructured layer 16 disposed on an opposing side. The image icon elements comprise voids 18, first cured pattern of image icon elements 30 disposed within the voids 18, second cured pattern of image icon elements 32 disposed within the voids 18, and empty areas (i.e., recreated voids) 18' within the voids 18.

In another embodiment, a further intermediate product is produced after further method steps which result in the incorporation of a third contrasting material 38 into the microstructured layer 16. This is best illustrated by way of the cross-sectional side view in FIG. 8. The third contrasting material is cured using non-collimated (scattered) light 40. As a result, there is no effective focusing by the focusing elements, and the entire icon layer is exposed. Effectively this ensures that all of the third pigmented material 38 is cured. This results in a further intermediate product comprising three cured patterns of image icon elements 30, 32, 38 as depicted in cross-sectional side view of FIG. 9. The sacrificial synthetic image is composed of the first pigmented material 30 (the first cured pattern) when viewed at a normal angle through the sacrificial focusing elements; the second pigmented material 32 (the second cured pattern) when viewed from the second cure angle; and the third pigmented material 38 (the third cured pattern) when viewed from an angle that is not the first or second cure angle.

In one embodiment, the embodiments described herein further comprise forming an intermediate product with one or more vacant icon spaces. To achieve this, a contrasting material which is unpigmented is disposed in the voids or recreated voids. These unpigmented materials are designed not to absorb laser light and are cured at angles other than the angles used to cure the pigmented materials. The advantage of such vacant icon spaces is as follows: when one or more laser markable layers are located below the optical device, and the unpigmented material(s) is directionally cured at the same angle that a laser engraver would use to write static 2D images, laser energy is allowed to pass through the optical device with little laser energy being absorbed thereby, which provides for superior laser engraving through the optical device.

Figure 9:
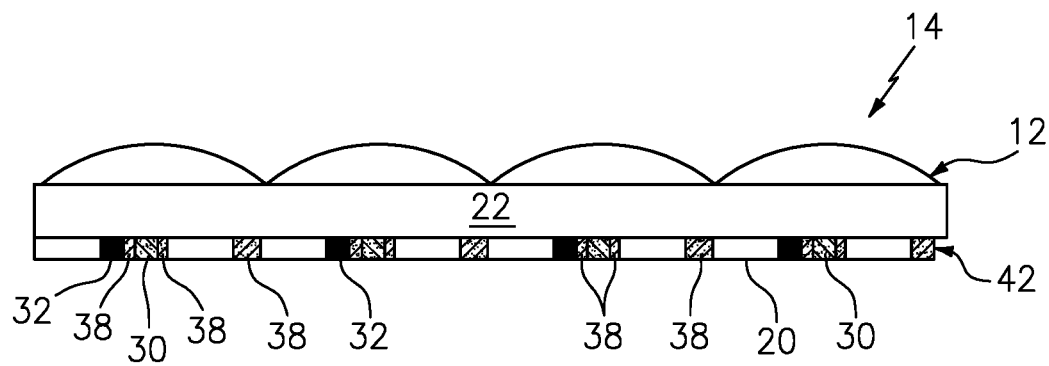

A microstructured layer, prepared in accordance with the above embodiments, is shown in FIG. 9, and marked, with reference number 42. There are three different cured patterns of image icon elements 30, 32, 38 in this case, two of which (30, 32) were directionally cured.

Figure 10A:
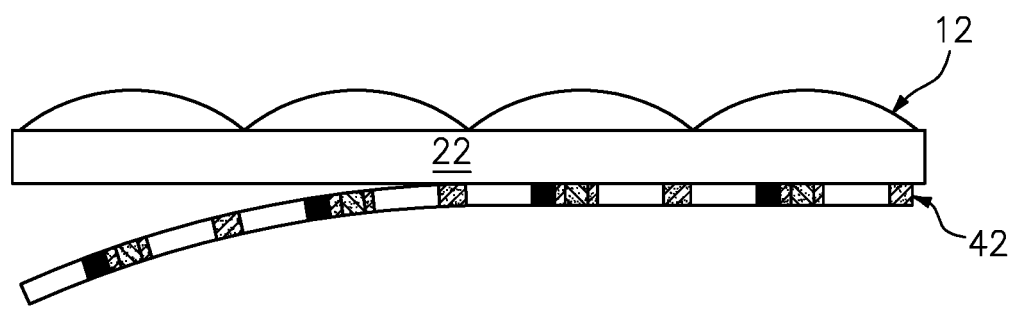
FIG. 10A is the intermediate optical security device shown in FIG. 9, with the arrangement of image icon elements partially separated from the first film for transfer to a second film with a fixed arrangement focusing elements on one surface thereof.
Figure 10B:
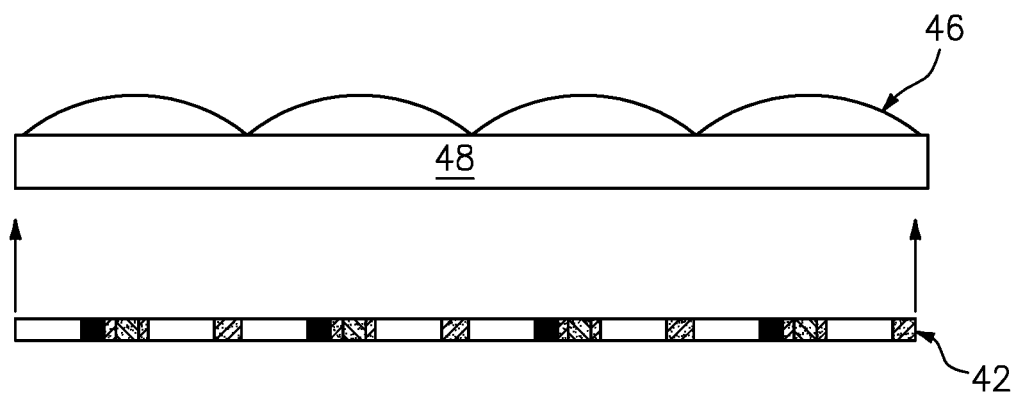
FIG. 10B is a cross-sectional side view of the second film with a fixed arrangement of focusing elements on one surface thereof, showing the image icon layer being transferred to an opposing surface thereof.

Once microstructured layer 42 has been prepared, a fixed arrangement of focusing elements 46 is added by any of the exemplary techniques described herein. In a first technique, as best shown in FIG. 10A, 10B, or 20A, 20B, the microstructured layer 42 is separated from the first film or optical spacer 22 (FIG. 10A). A fixed arrangement of focusing elements 46 formed on an upper surface of a second film or optical spacer 48 is layered with the microstructured layer 42; preferably over it (FIG. 10B). The sacrificial arrangement of focusing elements 12 and first film 22 may then be discarded. In a second technique (not shown), the microstructured layer is either prepared using a formulation that allows for easy removal from the film in a subsequent process step, or is applied onto a primer layer located on the first film. After making the permanent or fixed arrangement of focusing elements on an upper surface of a second film, a radiation (e.g., UV) curable layer is then added to the lower surface of the second film (but not cured). The microstructured layer 42 (along with first film 22 and sacrificial arrangement of focusing elements 12) is then placed against this radiation curable layer, the layer cured and the microstructured layer 42 adhered to the second film 48, after which the first film 22 and sacrificial arrangement of focusing elements 12 is removed and discarded. The radiation curable layer could also be a pressure sensitive adhesive, or a thermally cured layer.

Figure 11A:
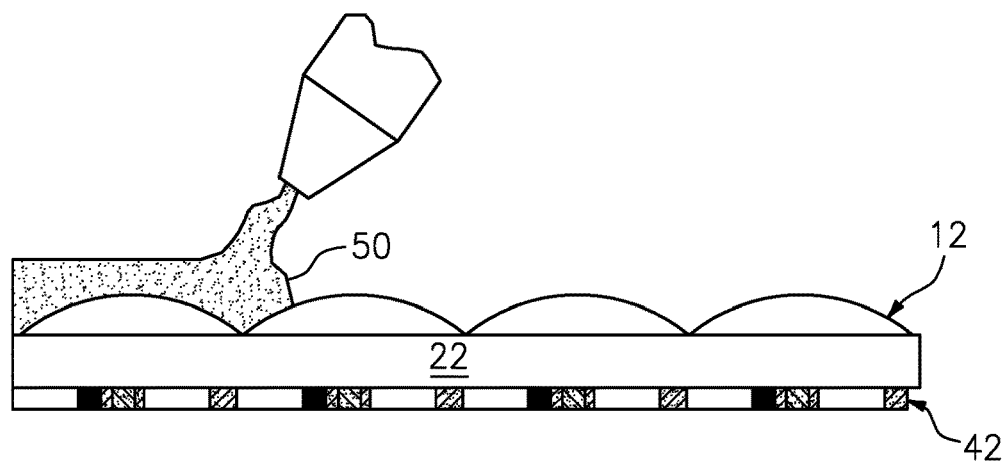
FIG. 11A is the intermediate security optical device shown in FIG. 9, with liquid polymer being applied to an outer surface of the sacrificial arrangement focusing elements.
Figure 11B:
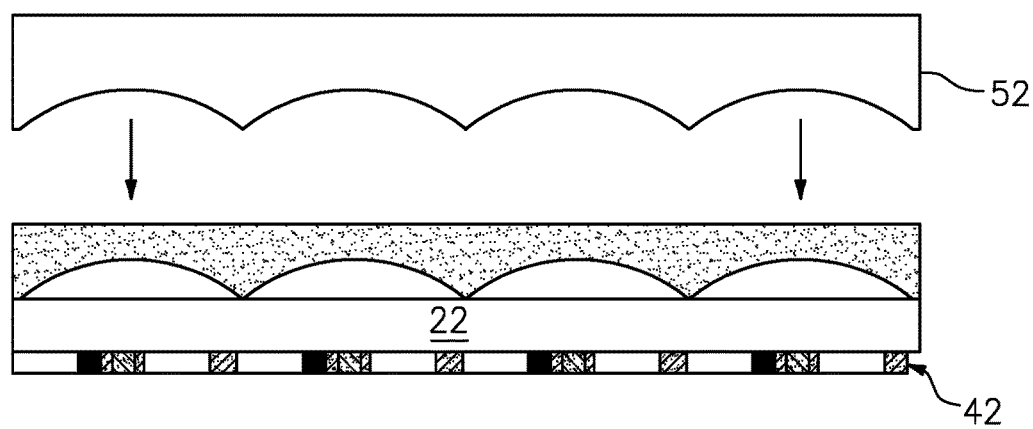
FIG. 11B is the intermediate optical device shown in FIG. 11A after the liquid polymer has been applied and before a mold is used to form the fixed arrangement of focusing elements in desired mismatch with respect to the cured pattern(s) of image icon elements.
Figure 11C:
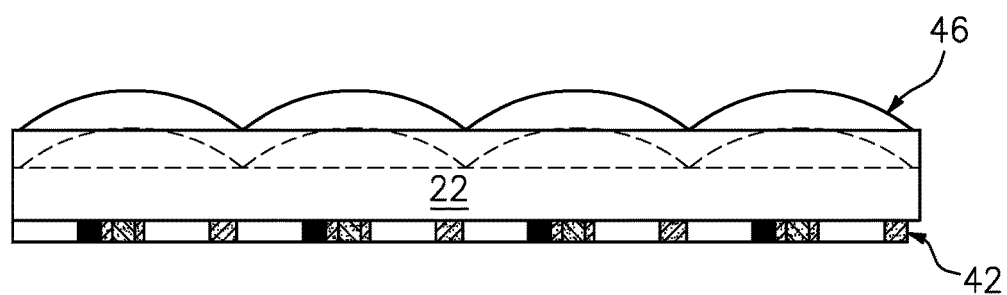
FIG. 11C is the optical security device shown in FIG. 11B after the permanent or fixed focusing element arrangement has been formed, turning the sacrificial focusing element arrangement into part of the first film or optical spacer.

In a third technique, as best shown in FIGS. 11A-C, a liquid polymer 50 is applied on top of the sacrificial focusing element arrangement 12 (FIG. 11A) and a mold 52 used to form the permanent or fixed focusing element arrangement 46 (FIGS. 11B,C). As best shown in FIG. 11C, the sacrificial arrangement of focusing elements 12 becomes integrated as part of the first film 22, the first film constituting an optical spacer. The fixed arrangement of focusing elements 46 and the sacrificial arrangement of focusing elements 12 may be made from materials with the same or very similar refractive indices. If they are the same refractive index, then there will be no refraction resulting from the top surface of the sacrificial focusing element arrangement, as light will no longer see that as an interface for refraction since there is no change in refractive index. If they are not very close in refractive index, then one would get moiré patterns from both surfaces instead of just from the surface of the permanent or fixed focusing element arrangement.

Where the sacrificial arrangement of focusing elements is removed through integration, the inventors have found that this added thickness can be alleviated by starting with a thinner (e.g., 20 μm) film as the optical spacer than one would normally use. For example, in one embodiment, the optical spacer is thinned to a thickness ranging from 5 μm to about 20 μm; more preferably from about 10 μm to about 15 μm. Of course, considerations of the impact on the focusing element curvature and refractive index of the focusing elements and optional sealing layer(s) must also be taken into consideration.

When performing directional curing with the sacrificial arrangement of focusing elements 12, the temporary sealing material (solvent) gives a larger difference in refractive index than the final focusing element arrangement and sealing layer(s), so that the focal length of the sacrificial focusing element arrangement/seal layer(s) is shorter and is thus in focus during the directional cure. Heat or other means is then applied to remove the solvent. Then, the permanent or fixed focusing element arrangement 46 would be added (optionally along with an embedding layer) so that there is no interface for refraction at the top surface of the sacrificial focusing element arrangement.

In one embodiment, where the sacrificial arrangement of focusing elements is removed by integration, an interface is formed between the material used to form the sacrificial arrangement of focusing elements and the material used to form the fixed arrangement of focusing elements. The inventors have surprisingly found that by having a recognizable interface, this provides a forensic feature which allows further authentication of the security device.

Figure 12:
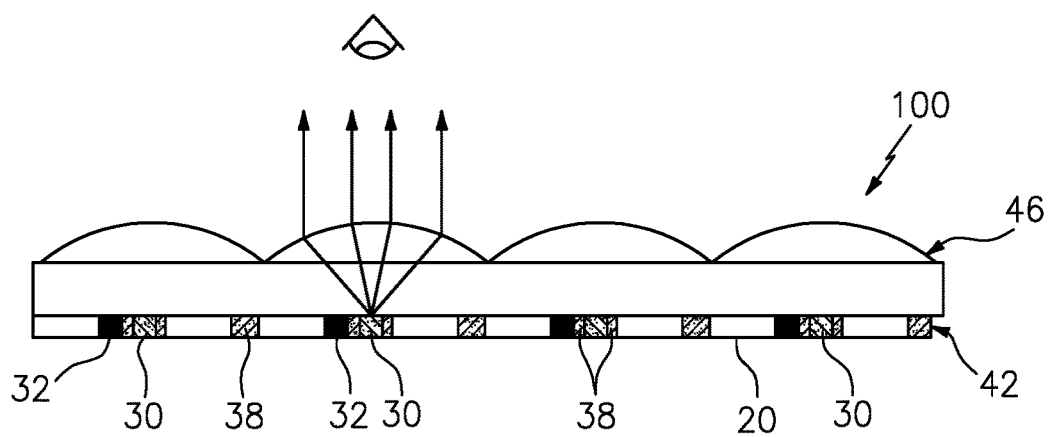
FIG. 12 is the optical security device shown in FIGS. 10B, 11C, showing an observer viewing the device from a first cure angle.
Figure 13:
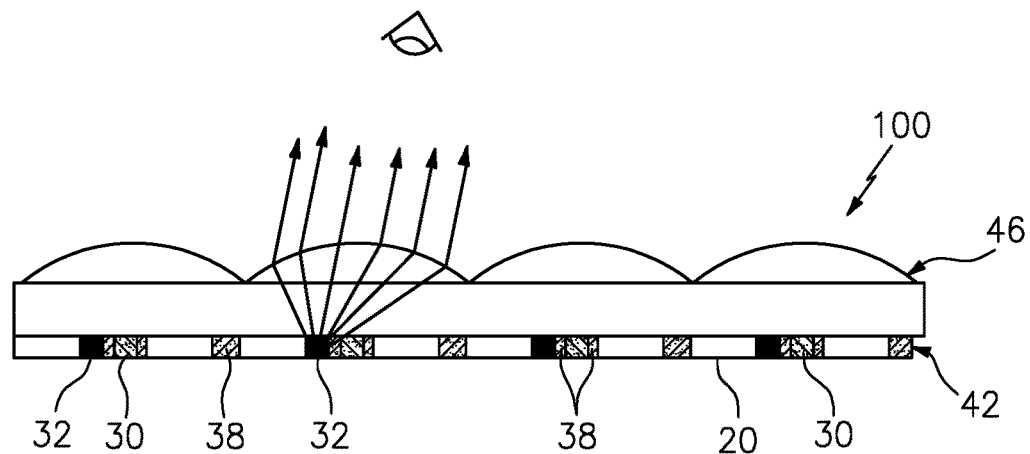
FIG. 13 is the optical security device shown in FIGS. 10B, 11C, showing an observer viewing the device from a second cure angle.

Referring now to FIG. 12, an observer, who is viewing the optical device of the present invention (formed in accordance with one of the above methods and marked with reference number 100) from the first cure angle, sees the synthetic image(s) associated with the cured first pigmented material 30. In FIGS. 12-13, the observer is "very far away" from the device such that the observer's effective angle to each of the focusing elements in FIG. 12, for example, is equivalent to the first cure angle. The synthetic image(s) associated with the cured first pigmented material 30 is only visible from the first cure angle.

Figure 14:
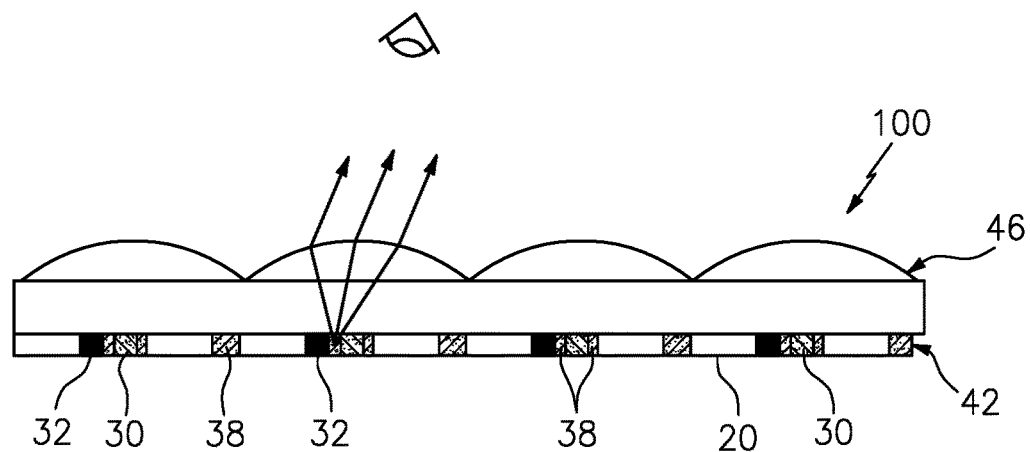
FIG. 14 is the optical security device shown in FIGS. 10B, 11C, showing an observe viewing the device from a third cure angle.

In one embodiment of the optical security device, presented in FIG. 12, the device comprises a fixed arrangement of focusing elements disposed over an optical spacer. On a side of the optical spacer, opposite the fixed arrangement, is disposed an arrangement of image icon elements. An observer viewing the device from a normal angle will observe a cured pattern of image icon elements that when viewed in cooperation with the magnification of the focusing elements creates a synthetic image composed of the contrasting material that was cured at that normal angle. As the observer's point of view changes to other cure angles, further cured patterns of image icon elements become observable and will cooperate with the fixed arrangement of focusing elements to produce a synthetic image composed of contrasting material that was cured at a cure angle which corresponds to the observer's point of view. FIG. 13 provides an embodiment where at least three cure angles were employed to cure three separate contrasting materials. As the observer's point of view changes from one cure angle to another, he observes a cured pattern of image icons that corresponds to the contrasting material that was cured at that cure/viewing angle. This is further illustrated by both FIG. 13 and FIG. 14, where it is depicted that the observer's point of view has been changed to a cure angle that corresponds to the second contrasting material 32 in FIG. 13 and then changes again to a cure/viewing angle that corresponds to the third contrasting material 38 in FIG. 14. At each viewing angle that corresponds to a cure angle, the observer sees a cured pattern of image icon elements that is composed of the contrasting material cured at that cure angle.

By directionally curing the various contrasting materials, the inventors were surprisingly able to produce an optical security device that demonstrates a smoother or faster color-transition from one contrasting material to another. As an observer's point of view changes over the various cure angles, an observer will observe a combination of multiple contrasting materials at least at angles that do not correspond to a cure angle. This combination of multiple contrasting materials allows for a smoother transition between what would otherwise be very large blocks of contrasting materials. This is demonstrated best in FIG. 15 where an observer sees multiple contrasting materials at various angles. These synthetic images comprising multiple contrasting materials is due to the mismatch between (1) the sacrificial arrangement of focusing elements used to cure the contrasting material and (2) the fixed arrangement used to view the arrangement of image icon elements.

For example, in FIGS. 12-13, the observer is "very far away" from the device such that the observer's effective angle to each of the focusing elements in FIG. 12, for example, is equivalent to the first cure angle. The synthetic image(s) associated with the cured first pigmented material 30 is only visible from the first cure angle.

Figure 15:
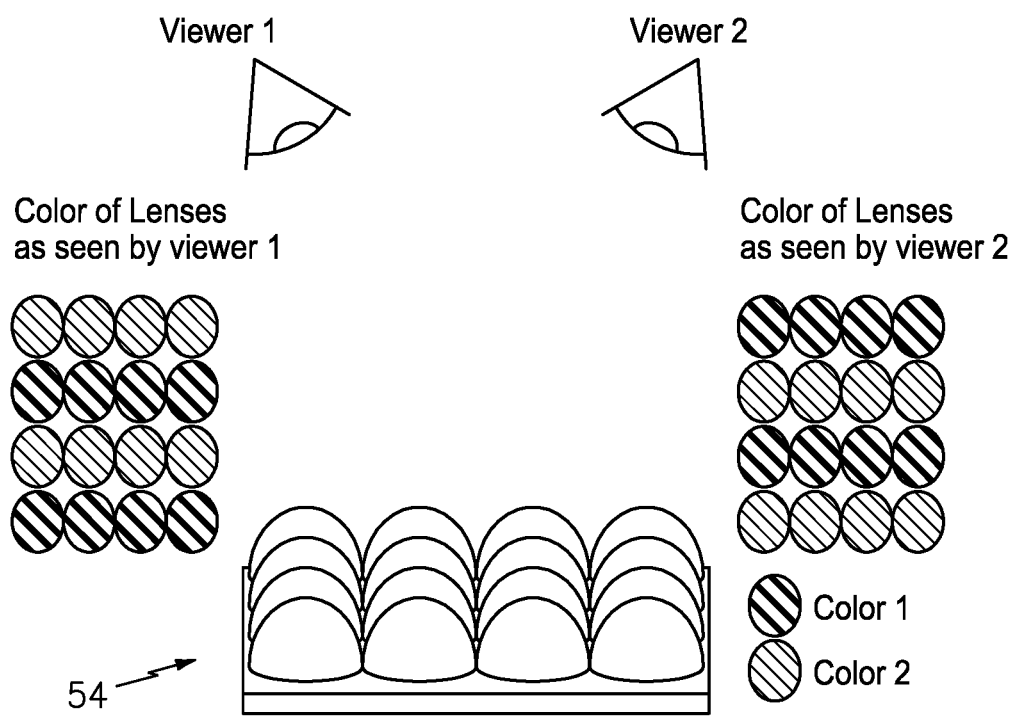
FIG. 15 is an optical security device demonstrating the fixed pattern of image icon elements viewable through the fixed arrangement of focusing elements when viewed from two different points of view.

FIG. 15 provides a top plan view of an exemplary embodiment 54 of the optical security device. As noted herein, by directionally curing the arrangement of image icon elements, the color of the synthetic images produced by the optical security devices will change as the observer changes view point from one cure angle to another. Interestingly, because the fixed arrangement of focusing elements is misaligned with the cured pattern of image icons, the color of the synthetic image will be composed of multiple contrasting materials. FIG. 15 illustrates this concept where Viewer 1 observes a synthetic image with a blend of multiple contrasting materials while Viewer 2 observes a synthetic image with a different blend of multiple contrasting materials.

Figure 16:
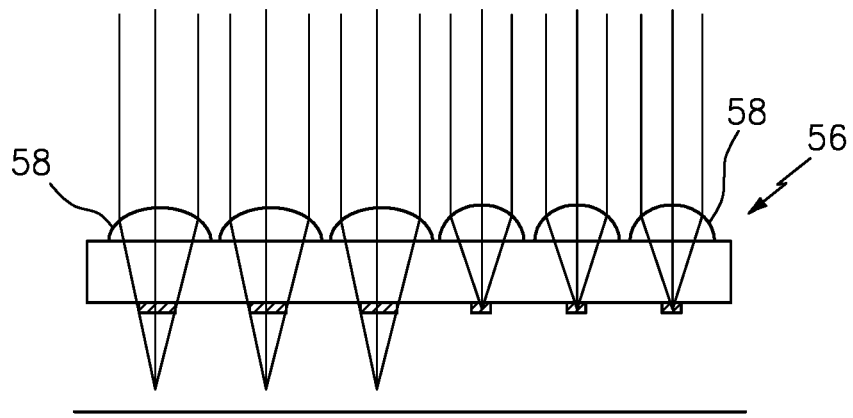
FIG. 16 is an intermediate optical security device demonstrating the varying pattern of the sacrificial arrangement of focusing elements.

FIG. 16 provides a cross-sectional view of another exemplary embodiment 56 of the inventive optical security device. As noted herein, the present invention contemplates embodiments where the size of the focusing elements 58, in the sacrificial arrangement of focusing elements, varies across the array. Varying the size of these focusing elements, preferably in a controlled pattern, the cured pattern of image icon elements produced from directional curing can also be varied. As depicted in FIG. 16, the image icon elements can be so modified and patterned through this variability in the sacrificial arrangement of focusing elements.

Figure 17:
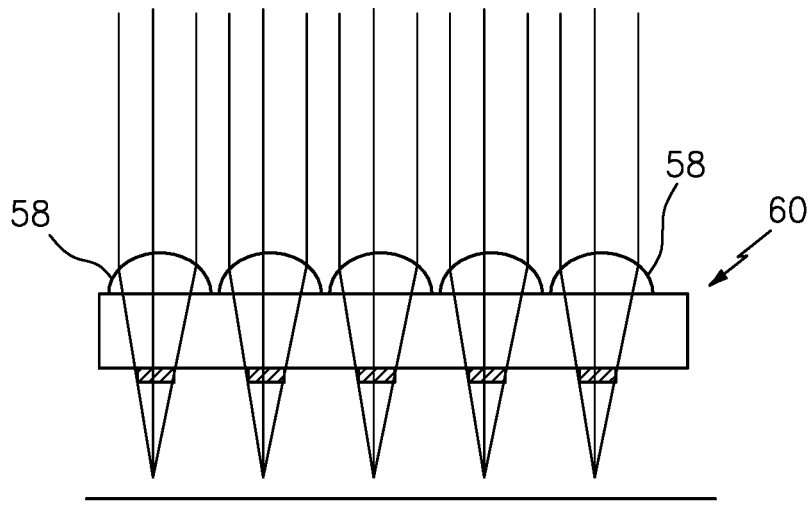
FIG. 17 is an intermediate optical security device demonstrating the far-sighted sacrificial arrangement of focusing elements.

It is also contemplated that the image icon elements can be patterned by adjusting the focal length of the sacrificial arrangement of focusing elements. For example, in FIG. 17 a "far-sighted" embodiment 60 is depicted, where the image icon elements used to form, for example, rolling bar synthetic images are made broader by using a wider cure angle range.

Figure 18:
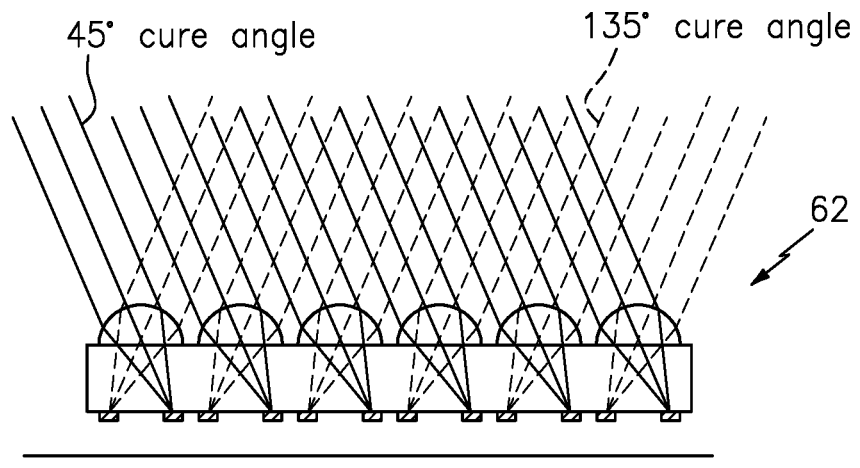
FIG. 18 is an intermediate optical security device demonstrating the varying cure angles.

It is also contemplated within the scope of the present invention that there may be multiple angles at which the directional curing will be applied. FIG. 18 depicts such an embodiment 62 where the directional curing occurs at about 45 degrees and about 135 degrees. As a result, the patterns generated in the arrangement of image icon elements are attributable to (and viewable at) the two distinct cure angles.

Figure 19A:
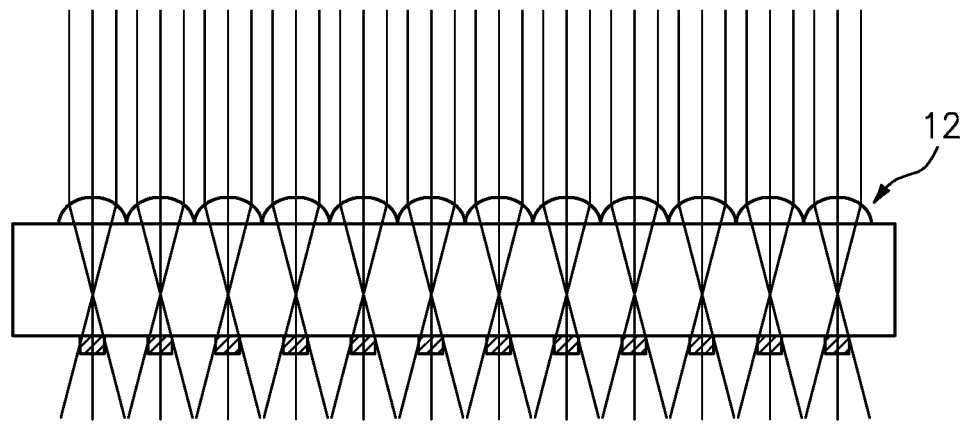
FIG. 19A is an intermediate optical security device in which the sacrificial arrangement of focusing elements has a period which is twice the period of the fixed arrangement of focusing elements, which is shown in FIG. 19B demonstrating the double-up arrangement of the sacrificial arrangement of focusing elements and the fixed arrangement of focusing elements.
Figure 19B:
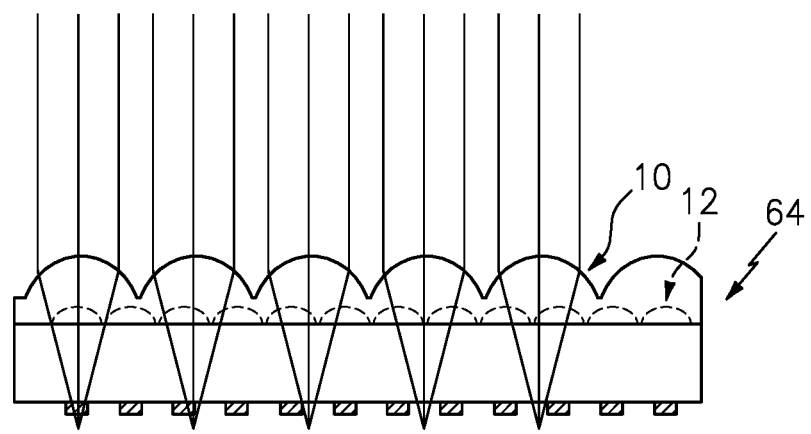

In one embodiment 64, depicted in FIGS. 19A and 19B, the sacrificial arrangement of focusing elements has a period which is twice the period of the fixed arrangement of focusing elements. This "double-up" embodiment produces double the pattern for faster movement of the synthetic image (e.g., rolling bars) or faster color control patterns using the fixed arrangement of focusing elements.

Figure 20A:
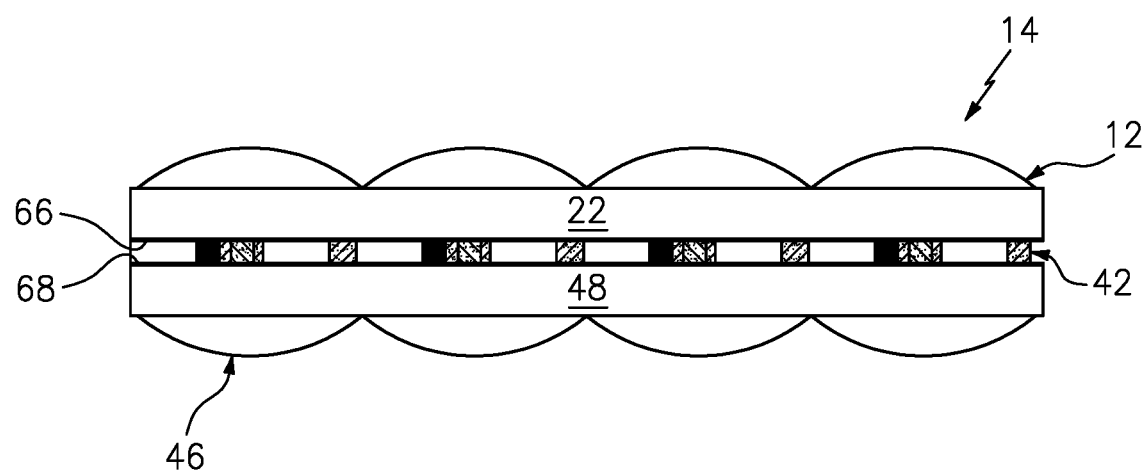
FIG. 20A is an optical security device shown prior to separation of the sacrificial arrangement of focusing elements and FIG. 20B is the same optical security device demonstrating separation of the sacrificial arrangement of focusing elements.
Figure 20B:
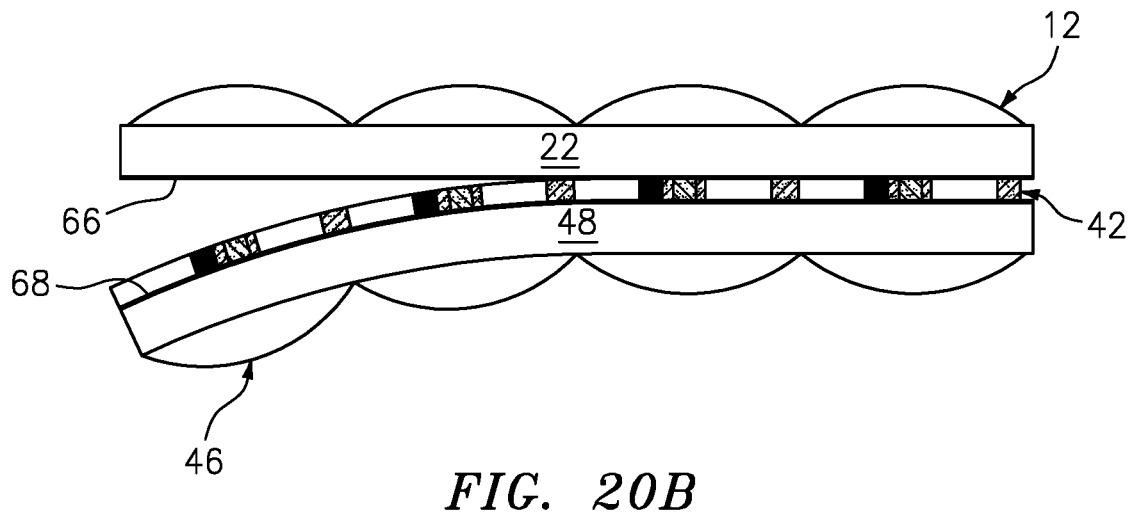

In FIGS. 20A and 20B, a sacrificial arrangement of focusing elements 12 (and first film 22) and a fixed arrangement of focusing elements 46 (and second film 48) are located on opposing sides of a microstructured layer 42. A primer or release layer 64 is located between first film 22 and microstructured layer 42, while an adhesive layer 66 is located between the microstructured layer 42 and second film 48. Curing may occur through (i) the sacrificial arrangement of focusing elements, (ii) the sacrificial arrangement of focusing elements and then through the fixed arrangement of focusing elements, or (iii) the fixed arrangement of focusing elements and then through the sacrificial arrangement of focusing elements. The sacrificial arrangement of focusing elements 12 and first film 22 would then be separated from the remaining assembly to form the inventive security device.

In a further aspect, the invention provides for a use of the optical security device or its intermediate products as an authentication means. The inventive optical security device can be utilized in a variety of different forms (e.g., strips, patches, security threads, planchettes) with any banknote, secure document or product for authentication purposes. For banknotes and secure documents, these materials are typically used in the form of a strip, patch, or thread and can be partially embedded within the banknote or document, or applied to a surface thereof. For passports or other ID documents, these materials could be used as a full laminate or inlayed in a surface thereof. For product packaging, these materials are typically used in the form of a label, seal, or tape and are applied to a surface thereof. As noted above, in one exemplary embodiment, the optical device is in the form of a patch embedded in a polymer ID card.

While various embodiments of the present invention have been described above, it should be understood that they have been presented by way of example only, and are not intended as limitations. Thus, the breadth and scope of the present invention should not be limited by any of the exemplary embodiments unless specified in the claims.

We claim:

1. An optical security device comprising:
a sacrificial arrangement of focusing elements comprising a first plurality of focusing elements arranged according to a first org-pattern;
a directionally cured arrangement of image icon elements having a pattern of a first contrasting material and a pattern of a second contrasting material, the pattern of the first contrasting material corresponding in part to the first org-pattern; and
a fixed arrangement of focusing elements disposed relative to the directionally cured arrangement of image icon elements such that the image icon elements project at least one synthetic image when viewed through the fixed arrangement of focusing elements, wherein the sacrificial arrangement of focusing elements is disposed between the fixed arrangement of focusing elements and the directionally cured arrangement of image icon elements,
wherein the fixed arrangement of focusing elements is disposed relative to the directionally cured arrangement of image icon elements such that a lens-icon mismatch is provided between the fixed arrangement of focusing elements and the directionally cured arrangement of image icon elements,
wherein the at least one synthetic image is a projection of both the first and second contrasting materials when viewed from at least one angle
wherein the at least one synthetic image produces a color-transition effect.

2. The device of claim 1, wherein the sacrificial arrangement of focusing elements integrated into the device as an optical spacer.

3. The device of claim 1, wherein the sacrificial arrangement of focusing elements forms an interface with the fixed arrangement of focusing elements.

4. The device of claim 1, wherein the pattern of the second contrasting material corresponds in part to the first org-pattern.

5. The device of claim 1, wherein the arrangement of image icon elements and the fixed arrangement of focusing elements are disposed on opposing sides of a first film.

6. The device of claim 1, wherein the image icon elements are formed as posts, recesses, voids, or a combination thereof.

7. The device of claim 6, wherein the image icon elements are voids or recesses filled or coated with a first pigmented material that is directionally cured and a second pigmented material that is directionally cured.

8. The device of claim 6, wherein the image icon elements are posts coated with a first pigmented material that is directionally cured and a second pigmented material, wherein the second pigmented material is different to the first pigmented material.

9. The device of claim 1, wherein the image icon elements comprise a first post formed from a pigmented material and a second post formed from an unpigmented material.

10. The device of claim 1, wherein the image icon elements comprise:
a first area surrounding a first post, the first area coated or filled, at least in part, with a pigmented material; and a second area surrounding a second post, the second area coated or filled, at least in part, with an unpigmented material.

11. The device of claim 1, wherein the image icon elements comprise:
a first void or recess coated, or at least partially filled, with a pigmented material; and
a second void or recess coated, or at least partially filled, with an unpigmented material.

12. The device of claim 1, wherein the image icon elements comprise:
a void comprising a base area and a side area extending from the base area,
wherein the side area is coated with a pigmented material contrasting to the base area.

* * * * *